(12) United States Patent
Mattam et al.

(10) Patent No.: US 12,284,557 B2
(45) Date of Patent: Apr. 22, 2025

(54) METHOD AND UE FOR HANDLING HANDOVER IN WIRELESS COMMUNICATION SYSTEM

(71) Applicant: Samsung Electronics Co., Ltd., Suwon-si (KR)

(72) Inventors: Jajohn Mathew Mattam, Bangalore (IN); Shreyas Sreenivasa, Bangalore (IN); Shanthossh Nagarajan, Bangalore (IN); Fasil Abdul Latheef, Bangalore (IN); Manasi Ekkundi, Bangalore (IN); Kailash Kumar Jha, Bangalore (IN); Nishant Sinha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 17/552,934

(22) Filed: Dec. 16, 2021

(65) Prior Publication Data

US 2022/0110041 A1    Apr. 7, 2022

Related U.S. Application Data

(63) Continuation of application No. PCT/KR2020/007925, filed on Jun. 18, 2020.

(30) Foreign Application Priority Data

Jun. 18, 2019 (IN) .............................. 201941024169
Sep. 5, 2019 (IN) .............................. 201941035834
Jun. 17, 2020 (IN) .............................. 2019 41024169

(51) Int. Cl.
  *H04W 36/00* (2009.01)
  *H04W 36/08* (2009.01)
  (Continued)

(52) U.S. Cl.
  CPC ... *H04W 36/0061* (2013.01); *H04W 36/0058* (2018.08); *H04W 36/08* (2013.01); *H04W 36/144* (2023.05); *H04W 36/302* (2023.05)

(58) Field of Classification Search
  CPC ............. H04W 36/30; H04W 36/0058; H04W 36/0061; H04W 36/0085; H04W 36/14;
  (Continued)

(56) References Cited

U.S. PATENT DOCUMENTS 9,961,598 B2   5/2018   Hoidis et al.
10,070,332 B2  9/2018   Wang et al.
(Continued)

FOREIGN PATENT DOCUMENTS

CN   101690359 A   3/2010
CN   103181209 A   6/2013
(Continued)

OTHER PUBLICATIONS

Extended European Search Report dated Jul. 1, 2022, issued in European Application No. 20827934.9-1216.
(Continued)

*Primary Examiner* — Jianye Wu
(74) *Attorney, Agent, or Firm* — Jefferson IP Law, LLP

(57) ABSTRACT

The disclosure relates to a pre-5th-Generation (5G) or 5G communication system to be provided for supporting higher data rates Beyond 4th-Generation (4G) communication system such as Long Term Evolution (LTE). A method for handling handover by a UE (400) is provided. The method includes determining, by User Equipment (UE), whether a measurement identity (ID) of a first neighboring cell and a measurement ID of a second neighboring cell are same. If the measurement ID of the first neighboring cell and the measurement ID of the second neighboring cell are different, the method includes prioritizing sending of a measurement
(Continued)

report of the first neighboring cell over a measurement report of the second neighboring cell to a serving cell. If the measurement ID of the first neighboring cell and the measurement ID of the second neighboring cell are same, the method includes splitting a measurement report for the first neighboring cell and a measurement report of the second neighboring cell and sending the measurement report of the first neighboring cell before the measurement report of the second neighboring cell.

15 Claims, 18 Drawing Sheets

(51) Int. Cl.
    *H04W 36/14*         (2009.01)
    *H04W 36/30*         (2009.01)

(58) Field of Classification Search
    CPC ... H04W 36/08; H04W 88/06; H04W 36/144; H04W 36/008; H04W 36/302
    See application file for complete search history.

(56) References Cited

U.S. PATENT DOCUMENTS

| | | |
|---|---|---|
| 11,147,000 B2 | 10/2021 | Yiu et al. |
| 2008/0159323 A1 | 7/2008 | Rinne et al. |
| 2012/0039189 A1 | 2/2012 | Suzuki et al. |
| 2015/0038141 A1 | 2/2015 | Cheng |
| 2015/0099523 A1 | 4/2015 | Yang et al. |
| 2015/0189560 A1 | 7/2015 | Ji |
| 2015/0327133 A1 | 11/2015 | Yiu et al. |
| 2016/0205573 A1 | 7/2016 | Yang et al. |
| 2019/0132755 A1 | 5/2019 | Dhanapal et al. |
| 2019/0268819 A1* | 8/2019 | Kim ............... H04W 72/04 |
| 2019/0357125 A1 | 11/2019 | Mildh et al. |

FOREIGN PATENT DOCUMENTS

| | | | |
|---|---|---|---|
| CN | 106465258 A | 2/2017 | |
| EP | 3454602 A1 | 3/2019 | |
| RU | 2693848 C1 * | 7/2019 | ........... H04B 7/0486 |
| WO | 2018/128862 A1 | 7/2018 | |
| WO | 2018/142303 A1 | 8/2018 | |
| WO | 2019/072904 A1 | 4/2019 | |
| WO | 2019/093790 A1 | 5/2019 | |
| WO | 2019/095162 A1 | 5/2019 | |

OTHER PUBLICATIONS

3rd Generation Partnership Project; Technical Specification Group Radio Access Network; NR; Radio Resource Control (RRC) protocol specification; (Release 15)', 3GPP TS 38.331 V15.5.1, Apr. 16, 2019.
Ericsson, "Measurement priority handdleing in NR", R2-1818344, 3GPP TSG-RAN2 Meeting #104, Spokane, US, Nov. 2, 2018.
ZTE Corporation et al., "Inter-RAT measurement for SRVCC from NR to UTRAN", R2-1906528, 3GPP TSG-RAN WG2 Meeting #106, Reno, USA, May 3, 2019.
3GPP TS 36.331 V15.6.0 (Jun. 2019) 3rd Generation Partnership Project; Technical Specification Group Radio Access Network; Evolved Universal Terrestrial Radio Access (E-UTRA); Radio Resource Control (RRC); Protocol specification (Release 15), Jun. 6, 2019.
Indian Office Action dated Nov. 26, 2021, issued in Indian Application No. 201941024169.
Chinese Office Action dated Jan. 24, 2024, issued in Chinese Patent Application No. 202080046907.5.
Indian Hearing Notice dated Feb. 21, 2024, issued in Indian Patent Application No. 201941024169.
Huawei et al., Discussion of Measurement Aspects for NR-NR DC, R2-1814114, 3GPP TSG-RAN WG2#103bis, Sep. 28, 2018.
Nokia Corporation et al., Measurement reporting, R2-081509, 3GPP TSG-RAN WG2 Meeting #61bis, Mar. 25, 2008.
Nokia Corporation et al., Measurement reporting, R2-082324, 3GPP TSG-RAN WG2 Meeting #62, Apr. 29, 2008.
European Office Action dated Apr. 23, 2024, issued in European Patent Application No. 20827934.9.
Chinese Office Action dated May 20, 2024, issued in Chinese Patent Application No. 202080046907.5.
Chinese Office Action dated Aug. 31, 2024, issued in Chinese Patent Application No. 202080046907.5.
Chinese Office Action dated Dec. 18, 2024, issued in Chinese Patent Application No. 202080046907.5.

* cited by examiner

METHOD AND UE FOR HANDLING HANDOVER IN WIRELESS COMMUNICATION SYSTEM

CROSS-REFERENCE TO RELATED APPLICATION(S)

This application is a continuation application, claiming priority under § 365(c), of an International application number PCT/KR2020/007925, filed on Jun. 18, 2020, which is based on and claims priority of an Indian Provisional patent application number, 201941024169, filed on Jun. 18, 2019, in the Indian Intellectual Property Office, and of an Indian Provisional patent application number, 201941035834, filed on Sep. 5, 2019, in the Indian Intellectual Property Office, and of an Indian Complete patent application number, 201941024169, filed on Jun. 17, 2020, in the Indian Intellectual Property Office, the disclosure of each of which is incorporated by reference herein in its entirety.

BACKGROUND

1. Field

The disclosure relates to a wireless communication. More particularly, the disclosure relates to a method and User Equipment (UE) for handling handover in wireless communication system by considering a type of a core network (CN) while evaluating cells for measurement reporting.

2. Description of Related Art

To meet the demand for wireless data traffic having increased since deployment of $4^{th}$ Generation (4G) communication systems, efforts have been made to develop an improved $5^{th}$ Generation (5G) or pre-5G communication system. The 5G or pre-5G communication system is also called a 'Beyond 4G Network' or a 'Post Long Term Evolution (LTE) System'.

The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (QAM) Frequency Quadrature Amplitude Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In general, a handover within a same core network (i.e., intra Evolved Packet Core (EPC) of an intra-fifth generation core (5GC)) only involves a radio level cell change and core network connectivity and routing remains unchanged except for a connection between a serving Evolved NodeB (eNB) and a core network (CN) through a S1 interface, whereas the handover between systems (i.e., EPC to 5GC or vice versa) involves a major impact at the CN as General Packet Radio Service (GPRS) Tunneling Protocol GTP tunnels, network interfaces, routing path all have to be translated from one CN to another CN in addition to radio level changes. Thus, the handover between systems (i.e., EPC to 5GC or vice versa) is more costly that an intra CN handover in terms of latency and complexity. Further, the handover between systems (i.e., EPC to 5GC or vice versa) also impacts a service provided to a user.

In an example, a UE camped on a New Radio (NR) cell and configured to measure Long-Term Evolution (LTE) neighbour cells. The UE may detect the LTE neighbour cells that connect to the EPC or the 5GC and a serving cell is unaware if a measurement report (MR) contains EPC connected cells or 5GC connected cells. Similar way, the UE camped on the LTE cell connected to the 5GC and configured to measure the LTE neighbour cells and the UE may detect LTE neighbour cells that connects to the EPC or the 5GC and the serving cell is unaware if the MR contains EPC connected cells or 5GC connected cells. Hence, the serving cell provides the handover to a cell that requires a CN change even if there are cells that are available which does not require the CN change (i.e., handover is triggered to an EPC connected LTE cell instead of a 5GC connected LTE cells).

FIG. 1 illustrates an example overview of a system (1000) in which Evolved Universal Terrestrial Radio Access (EU-TRA) cells are connected with the 5GC through a work item (WI) code LTE_5GC network connect-core according to the related art.

Referring to FIG. 1, in the system (1000b), the eNB (110) is connected with a next generation eNB (Ng-eNB) (120a) through an X2 interface. The Ng-gNBs (120a and 120b) are connected with each other through an Xn/X2 interface. The eNB (110) is connected with a Mobility Management Entity (MME)/a secondary Gateway (S-GW) (130) through a S1 interface. The Ng-eNBs (150a and 150b) are connected with an Access and Mobility Management Function (AMF)/a User Plane Function (UPF) (140) through a new generation (NG) interface. Further, if the UE is in the connected state, the serving cell configures the UE to perform neighbour measurements primarily to assist and facilitate handover to the neighbour cell. However, the UE is not aware of the neighbour cell associated the CN while performing measurements in the connected state and hence the UE is not aware if the measured cell connects to the EPC or to the 5GC.

FIGS. 2A and 2B are another example scenarios in which a normal Evolved Universal Terrestrial Radio Access (E-UTRAN) New Radio-Dual Connectivity (ENDC) deployment scenario is depicted according to the related art.

Referring to FIGS. 2A and 2B, in the normal ENDC deployment scenario, both mmw cell (220) and sub6 cell (210) are present, a coverage of sub6 cell (210) will be greater than the coverage of the mmw cell (220). The sub6 cell (210) may have an overlapping coverage with the mmw cell (220). A downlink (DL) signal power also will be better for the sub6 cell (210) when compared to the mmw (based on a positioning of the UE). In these scenarios, when the UE is trying to add the NR cell (for the ENDC) based on a B1 threshold, the UE is highly likely to get the sub6 cell (210) to be stronger and meet the B1 threshold faster. This will result in a network adding the sub6 cells (210) as a 2nd leg in case of ENDC (or in any case where NR is the second leg). When there is proper coverage, it is always better for the UE to select mmw cell (220). The NR is defined as measurement event when NR neighbour becomes better than a configured threshold value. This threshold can be in terms of RSRP/RSRQ.

FIG. 3 is another example scenario in which the UE moves from an ENDC cell (i.e., ENDC cell supports LTE and NR) to a Non-ENDC cell is depicted according to the related art.

Referring to FIG. 3, due to 5G standalone technology still being in beginning stages, standards, device manufacturers and operators came into a decision of deploying in a Non-Standalone (NSA) mode where the LTE cell will still act as an anchor and the NR cell will be added as a secondary cell. Hence, the NR availability to the UE depends on the LTE anchor to which the UE is camped on. If the LTE anchor supports the ENDC (i.e., EUTRA NR dual connectivity), then the LTE anchor can add the NR secondary cell to the UE. However, the UE frequently gets handover among multiple LTE cells. If the UE gets handover to the LTE cell which cannot support as the anchor to the NR secondary cell (or Non-ENDC cell), there would be sudden degradation of the quality of service and data speed that the UE would receive, causing hindrance to the user.

In an example, the UE will move from ENDC cell (i.e., ENDC cell supports LTE and NR) to another Non-ENDC cell while playing/downloading high definition video. As the new target Cell is not supporting the NR, due to sudden drop in the data speed, user of the UE will experience buffering. In cell edge conditions, the buffering issue as shown in FIG. 3 can be frequent.

The above information is presented as background information only to assist with an understanding of the disclosure. No determination has been made, and no assertion is made, as to whether any of the above might be applicable as prior art with regard to the disclosure.

SUMMARY

If the UE gets handover to the LTE cell which cannot support as the anchor to the NR secondary cell (or Non-ENDC cell), there would be sudden degradation on the quality of service and data speed that the UE would receive causing hindrance to the user.

In an example, the UE will move from ENDC cell (i.e., ENDC cell supports LTE and NR) to another Non-ENDC cell while playing/downloading high definition video. As the new target Cell is not supporting the NR, due to sudden drop in the data speed, user of the UE will experience buffering. In cell edge conditions, there can be frequent buffering issue.

Aspects of the disclosure are to address at least the above-mentioned problems and/or disadvantages and to provide at least the advantages described below. Accordingly, an aspect of the disclosure is to provide a method and UE for handling handover by considering a type of a CN while evaluating cells for measurement reporting in a wireless communication system.

Additional aspects will be set forth in part in the description which follows and, in part, will be apparent from the description, or may be learned by practice of the presented embodiments.

In accordance with an aspect of the disclosure, a method for handling handover in a wireless communication system is provided. The method includes receiving, by a UE, a first measurement configuration and a second measurement configuration from a network to connect to a next generation core and a legacy core entity, identifying, by the UE, a first neighboring cell and a second neighboring cell from a plurality of neighboring cells having a signal strength above a predefined threshold, identifying, by the UE, that the first neighboring cell supports the next generation core and the second neighboring cell supports the legacy core entity, determining, by the UE, whether a measurement identity (ID) of the first neighboring cell and a measurement ID of the second neighboring cell are same, performing, by the UE, one of: in response to determining that the measurement ID of the first neighboring cell and the measurement ID of the second neighboring cell are different, prioritizing sending of a measurement report of the first neighboring cell over a measurement report of the second neighboring cell to a serving cell, and in response to determining that the measurement ID of the first neighboring cell and the measurement ID of the second neighboring cell are same, splitting a measurement report for the first neighboring cell and a measurement report of the second neighboring cell and sending the measurement report of the first neighboring cell before the measurement report of the second neighboring cell.

In an embodiment, the sending of the measurement report of the first neighboring cell is prioritized over the measurement report of the second neighboring cell to the serving cell by one of adding an offset to a measurement quantity threshold of the first neighboring cell, and adding an offset to time to trigger the measurement report of the second neighboring cell.

In an embodiment, the measurement report for the first neighboring cell and the measurement report of the second neighboring cell is splitted by one of adding an offset to a measurement quantity threshold of the first neighboring cell, and adding an offset to timer to trigger the measurement report of the second neighboring cell.

In an embodiment, the measurement report for the first neighboring cell and the measurement report of the second neighboring cell is splitted by creating a separate measurement report for a legacy cell and delaying sending of the measurement report after the next generation core.

In an embodiment, the identifying, by the UE, that the first neighboring cell supports the next generation core and the second neighboring cell supports the EPC comprises acquiring, by the UE, a system information block (SIB) 1 type message from the first measurement configuration and the second measurement configuration, wherein the SIB 1 type message comprises a list of Public Land Mobile Networks (PLMNs) that is connected to the next generation core or the legacy core entity, and identifying, by the UE, that the first neighboring cell supports the next generation core and the second neighboring cell supports the EPC based on the acquired SIB 1 type message.

In an embodiment, the predefined threshold is configured by the network or the UE.

In an embodiment, the first measurement configuration and the second measurement configuration are received over an RRC message.

In an embodiment, the first neighboring cell and the second neighboring cell from the plurality of neighboring cells are identified based on the first measurement configuration and the second measurement configuration In an embodiment, if the next generation core is a sixth generation cell (6g) then, the legacy core entity is one of a 5G cell, a 4G cell, a 3G cell, 2G cell and a CDMA cell.

In an embodiment, if the next generation core is a fifth generation cell (5g) then, the legacy core entity is one of a 4G cell, a 3G cell, 2G cell and a CDMA cell.

In an embodiment, the serving cell is an mmw cell or sub6 cell, and the first neighboring cell is an mmw cell, the second neighboring cell is sub6 cell, wherein the mmw cell is mapped to a cell connected to the next generation core and the sub6 cell is mapped to a cell connected to the legacy core entity.

In accordance with another aspect of the disclosure, a method for handling handover in a wireless communication system is provided. The method includes receiving, by a UE, a measurement configuration from the wireless communication system, when the UE is connected to serving cell, identifying, by the UE, at least one of a first neighboring cell and a second neighboring cell from a plurality of neighboring cells having a signal strength above a signal strength of the serving cell, determining, by the UE, that the first neighboring cell supports a next generation network (e.g., E-UTRAN New Radio-Dual Connectivity (EN-DC)) and the second neighboring cell supports a legacy core entity based on a System Information Block 2 (SIB 2) type message broadcasted by the at least first neighboring cell and the second neighboring cell, detecting, by the UE, the signal strength of the serving cell to be below a pre-defined threshold, sending, by the UE, a measurement report by prioritizing the first neighboring cell over the second neighboring cell to initiate a handover to the first neighboring cell.

In an embodiment, the method further includes updating an information related to the first neighboring cell supporting the next generation network in a memory when the first neighboring cell supports the next generation network.

In an embodiment, the method further includes starting a timer for the first neighbor cell and delaying to send the measurement report of the first neighbor cell until the timer is expired, when the first neighboring cell does not support the next generation network.

In an embodiment, the method further includes determining, by the UE, whether the second neighbor cell supports the next generation network when the first neighbor cell does not support the next generation network. Further, the method includes performing, by the UE one of: in response to determining that the second neighbor cell supports the next generation network, updating an information indicating that the second neighbor cell supports the next generation network and sending a measurement report, and in response to determining that the second neighbor cell does not support the next generation network, starting the timer for a third neighbor cell and delaying to send the measurement report of the third neighboring cell until the timer is expired.

In an embodiment, the measurement configuration is received over an RRC message.

In an embodiment, the serving cell is one of an LTE cell and a 5G cell.

In accordance with another aspect of the disclosure, a UE for handling handover in a wireless communication system is provided. The UE includes a processor coupled with a memory. The processor is configured to receive a first measurement configuration and a second measurement configuration from a network to connect to a next generation core and a legacy core entity, identify a first neighboring cell and a second neighboring cell from a plurality of neighboring cells having a signal strength above a predefined threshold, identify that the first neighboring cell supports the next generation core and the second neighboring cell supports the legacy core entity, determine whether a measurement identity (ID) of the first neighboring cell and a measurement ID of the second neighboring cell are the same, in response to determining that the measurement ID of the first neighboring cell and the measurement ID of the second neighboring cell are different, prioritize sending of a measurement report of the first neighboring cell over a measurement report of the second neighboring cell to a serving cell, and split a measurement report for the first neighboring cell and a measurement report of the second neighboring cell and send the measurement report of the first neighboring cell before the measurement report of the second neighboring cell in response to determining that the measurement ID of the first neighboring cell and the measurement ID of the second neighboring cell are same.

In accordance with another aspect of the disclosure, a UE for handling handover in a wireless communication system is provided. The UE includes a processor coupled with a memory. The processor is configured to receive a measurement configuration from the wireless communication system, when the UE is connected to a serving cell. Further, the processor is configured to identify at least one a first neighboring cell and a second neighboring cell from a plurality of neighboring cells having a signal strength above a signal strength of the serving cell. Further, the processor is configured to determine that the first neighboring cell supports a next generation network and the second neighboring cell supports a legacy core entity based on a System Information Block 2 (SIB 2) type message broadcasted by the at least first neighboring cell and the second neighboring cell. Further, the processor is configured to detect the signal strength of the serving cell to be below a pre-defined threshold. Further, the processor is configured to send a measurement report by prioritizing the first neighboring cell over the second neighboring cell to initiate a handover to the first neighboring cell.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The principal effect of the embodiments herein is to provide a method and UE for handling handover by considering a type of a CN while evaluating cells for measurement reporting in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
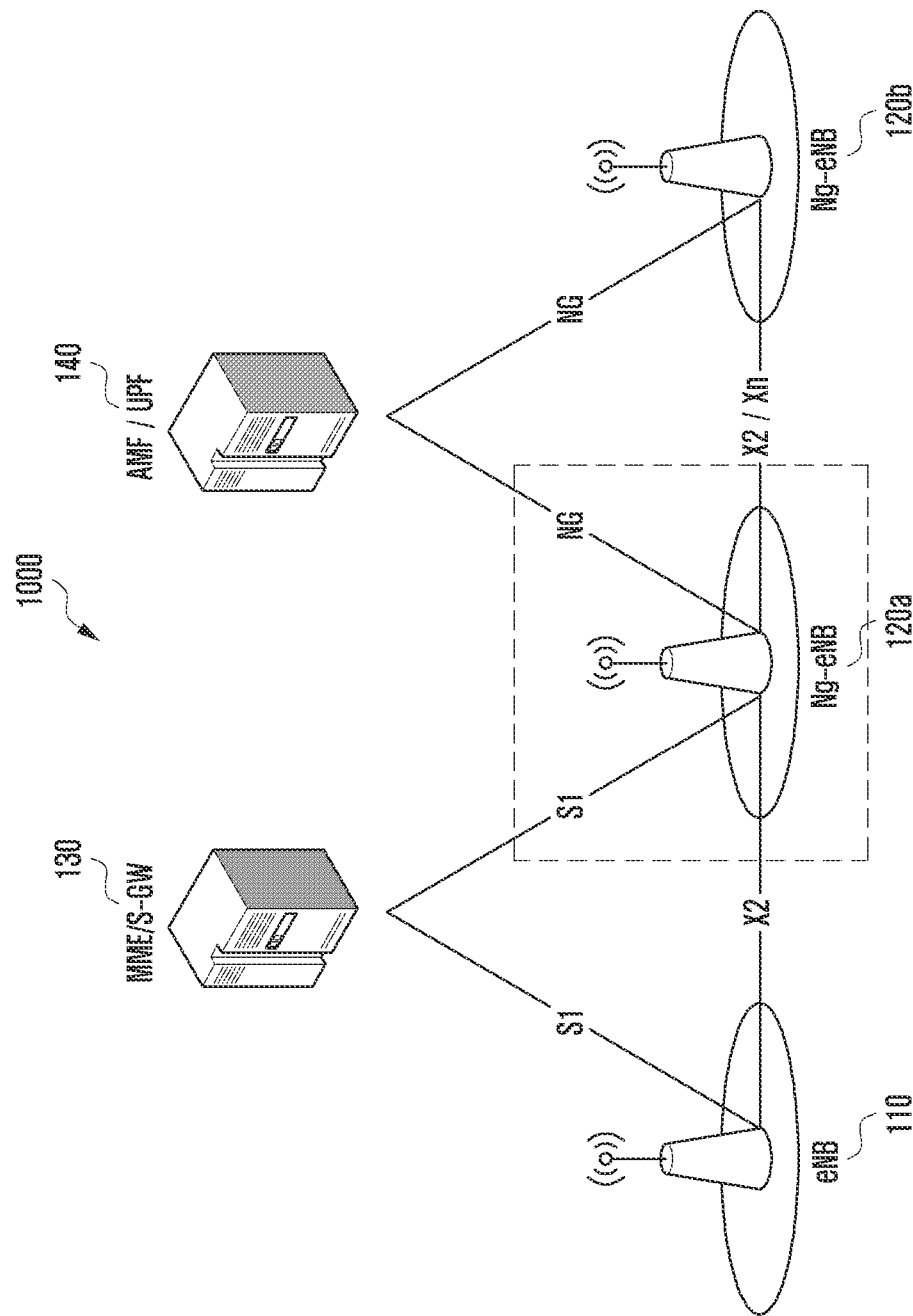
FIG. 1 illustrates an example overview of a system in which EUTRA cells are connected with a 5GC through a WI code LTE_5GC network connect-core, according to the related art.
Figure 2A:
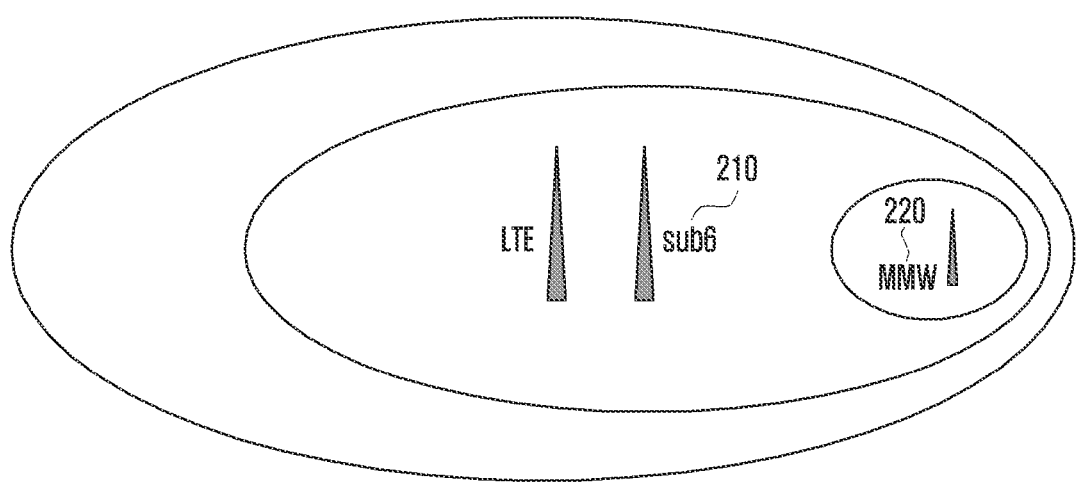
FIGS. 2A and 2B are example scenarios in which normal E-UTRAN ENDC deployment scenario is depicted, according to the related art.
Figure 2B:
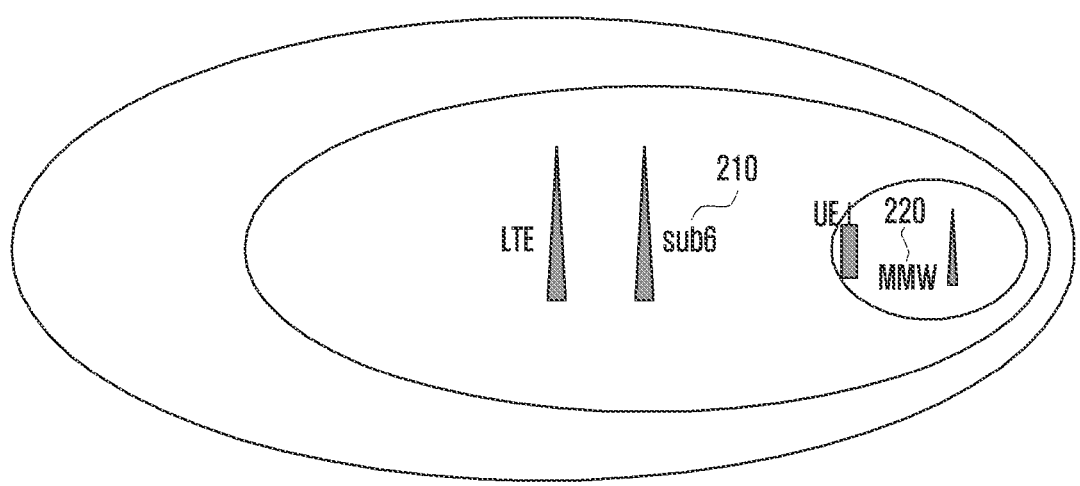
Figure 3:
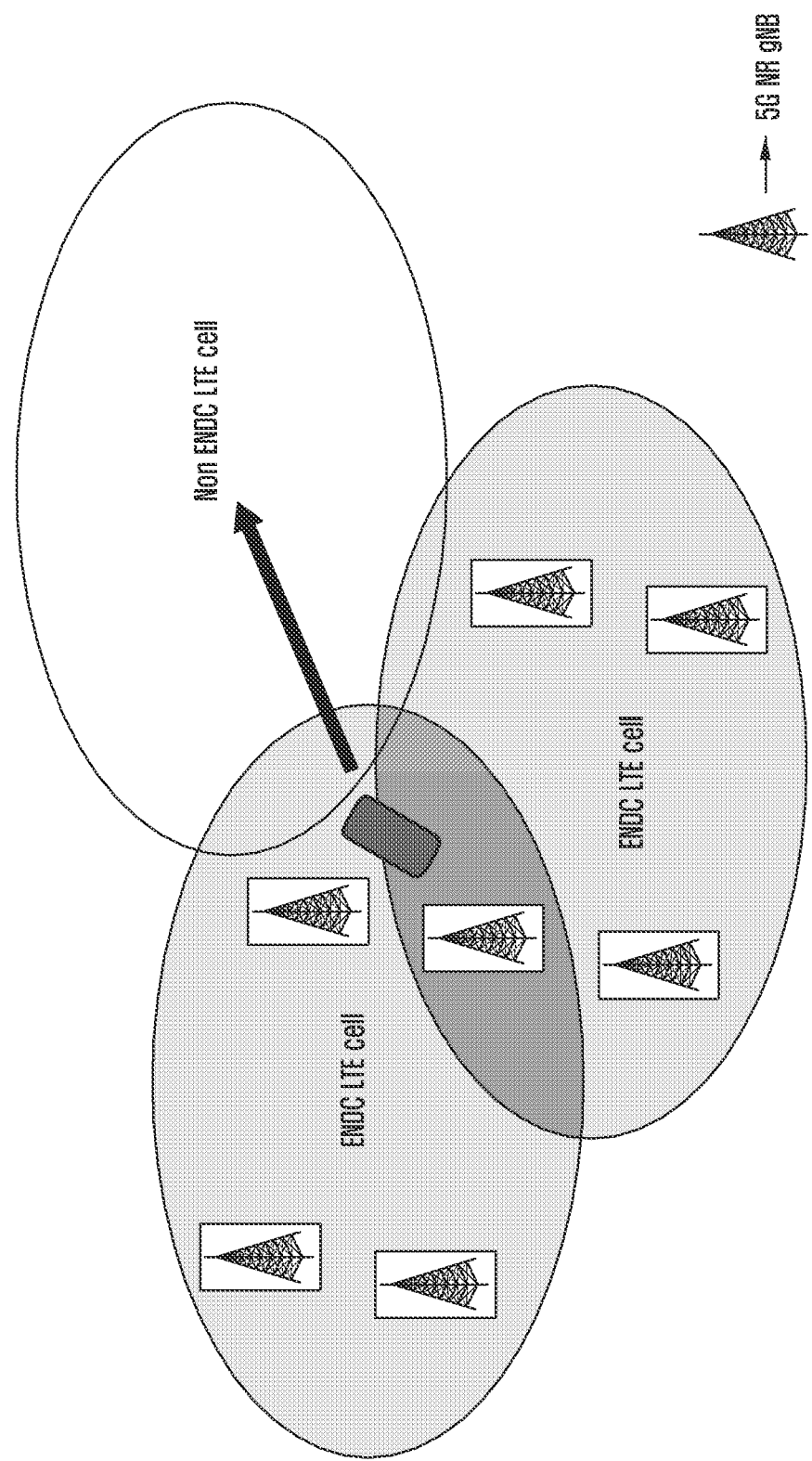
FIG. 3 is another example scenario in which UE moves from an ENDC cell (i.e., ENDC cell supports LTE and NR) to a non-ENDC cell is depicted, according to the related art.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The principal aspect of the embodiments herein is to provide a method and UE for handling handover by considering a type of a CN while evaluating cells for measurement reporting in a wireless communication system.

Another aspect of the embodiments herein is to add an offset to a measurement quantity threshold of a serving cell, so as to prioritize at least one neighbor cell connected to a 5GC entity for handover if the at least one neighbor cell is connected with the 5GC entity.

Another aspect of the embodiments herein is to add an offset to time to trigger a measurement report of the serving cell so as to prioritize the at least one neighbor cell connected to the 5GC entity for handover if the at least one neighbor cell is not connected with the 5GC entity.

Another aspect of the embodiments herein is to send a measurement report for a first neighbor cell connected to the 5GC connectivity, and send a measurement report for the second neighbor cell connected to an EPC after sending the measurement report for the first neighbor cell connected to the 5GC entity so as to prioritize at least one neighbor cell connected to the 5GC entity for handover, if a measurement identifier of the first neighbor cell from the at least one neighbor cell is different from a measurement identifier of the second neighbor cell from the at least one neighbor cell.

Another aspect of the embodiments herein is to send measurement reports based on connection of the first neighbor cell and the second neighbor cell with one of the 5GC and the EPC so as to prioritize at least one neighbor cell connected to a 5GC entity for handover if the measurement identifier of the first neighbor cell from the at least one neighbor cell is same as the measurement identifier of the second neighbor cell from the at least one neighbor cell Another aspect of the embodiments herein is to prioritize an mmw cell over a sub6 cell by adding the offset to the measurement quantity threshold of the serving cell, if the at least one neighbor cell is connected with the 5GC entity.

Another aspect of the embodiments herein is to prioritize the mmw cell over the sub6 cell by adding the offset to time for triggering a measurement report of the serving cell if the at least one neighbor cell is not connected with the 5GC entity.

Another aspect of the embodiments herein is to increase a probability of getting a handover to an LTE anchor that supports an ENDC.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a nonexclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for handling handover in a wireless communication system. The method includes receiving, by a UE, a first measurement configuration and a second measurement configuration from a network to connect to a next generation core and a legacy core entity. Further, the method includes identifying, by the UE, a first neighboring cell and a second neighboring cell from a plurality of neighboring cells having a signal strength above a predefined threshold; identifying, by the UE, that the first neighboring cell supports the next generation core and the second neighboring cell supports the legacy core entity; determining, by the UE, whether a measurement identity (ID) of the first neighboring cell and a measurement ID of the second neighboring cell are the same; and performing, by the UE, one of: in response to determining that the measurement ID of the first neighboring cell and the measurement ID of the second neighboring cell are different, prioritizing sending of a measurement report of the first neighboring cell over a measurement report of the second neighboring cell to a serving cell, and in response to determining that the measurement ID of the first neighboring cell and the measurement ID of the second neighboring cell are same, splitting a measurement report for the first neighboring cell and a measurement report of the second neighboring cell and sending the measurement report of the first neighboring cell before the measurement report of the second neighboring cell.

The proposed method may be used to add an offset to measurement configurations for the LTE cells connected to the 5GC entity. This is to prioritize the LTE cells connected to 5GC entity. Once a measurement reporting criteria is met after modifying the measurement configurations, the proposed method can be used to modify a report quantity as per an actual measurement configuration and report the measurement configuration to the wireless communication system.

If the measurement reporting criteria is met for multiple cells which are connected to the LTE cells and if the evaluation for the LTE cells connected to the 5GC entity are ongoing (considering these will satisfy the measurement reporting criteria), the UE may choose to wait for the evaluation of the LTE cells to be completed and send the measurement report to the one which is connected to the 5GC entity. While waiting for the evaluation to be completed, if the serving cells goes poor and if the UE is in a stage to lose the connection, the UE may choose to send the measurement report with the existing evaluated cells which are connected to an EPC.

If multiple cells meet the measurement reporting criteria, the method may be used to prioritize the measurement reports for the cells connected to the 5GC entity. If multiple cells belong to the same measurement identifier meets the measurement reporting criteria of reporting, the method can be used to prioritize the cells connected to the 5GC entity, sent the measurement report only with the cells to the wireless communication system. Further, the method can be used to send the measurement report with the same measurement identifier with the remaining cells after a configurable time. This will help the wireless communication system to initiate the handover to the LTE cell connected to the 5GC entity.

The method can be used to support a continuity of Ultra-reliable low latency communication (URLLC) services. The UE can prioritize 5G CN, so that the URLLC services can be availed accordingly. The proposed method can be used to increase the probability of getting the handover to LTE anchor that supports ENDC (i.e., 5G NR secondary cell. This results in ensuring the quality of service when the UE is in a connected mode.

Referring now to the drawings, and more particularly to FIGS. 4 through 10, there are shown preferred embodiments.

Figure 4:
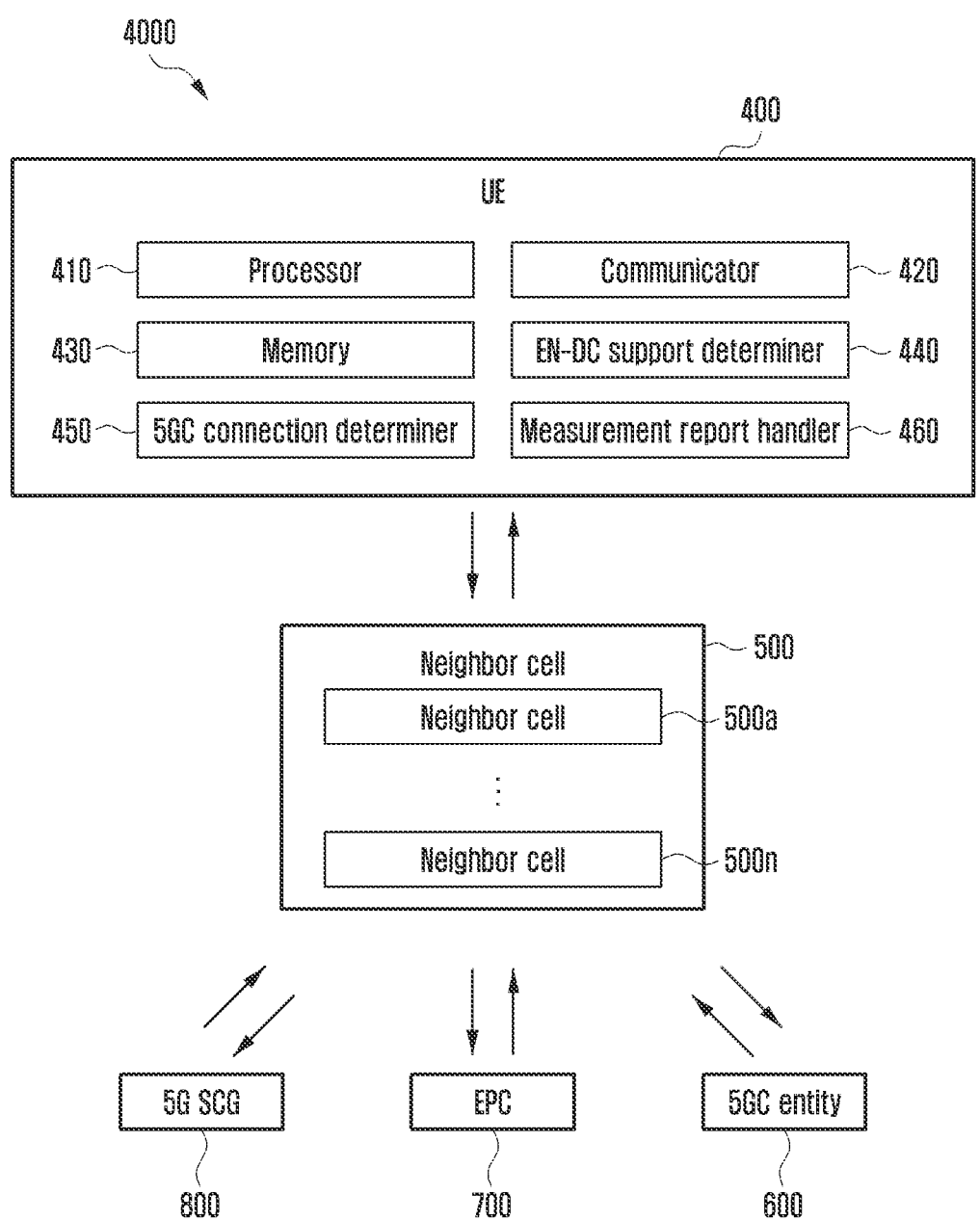
FIG. 4 illustrates an example overview of a wireless communication system for handling handover, according to an embodiment of the disclosure.

FIG. 4 illustrates an overview of a wireless communication system (4000) for handling handover, according to an embodiment of the disclosure.

Referring to FIG. 4, the wireless communication system (4000) includes a UE (400), a plurality of neighbor cells (500a-400n), a 5GC entity (600), an EPC 700, and a 5G SCG (800). Hereafter, the label of plurality of neighbor cells is 400.

The UE (400) may be, but is not limited to, a cellular phone, a smart phone, a Personal Digital Assistant (PDA), a wireless modem, a tablet computer, a laptop computer, a Universal Serial Bus (USB) dongle, an Internet of Things (IoT), a virtual reality device or the like. The UE (400) may include a processor (410), a communicator (420), a memory (430), an EN-DC support determiner (440), a 5GC connection determiner (450) and a measurement report handler (460).

According to an embodiment of the disclosure, the processor (410) receives the measurement configuration. The processor (410) is configured to detect the at least one neighbor cell based on the received measurement configuration. The processor (410) is configured to acquire the SIB 1 type message from at least one neighbor cell among the plurality of neighbor cells (500). The 5GC connection determiner (450) is configured to identify that the at least one neighbor cell supports the CN connectivity based on the acquired SIB 1 type message. The reading of SIB1 to identify the CN type can be limited to the 1st measurement/detection of the cells on a frequency. The 5GC connection determiner (450) is configured to determine whether the at least one neighbor cell is connected with the 5GC entity (600).

In SIB1, the wireless communication system (4000) sends the list of PLMNs that can be connected to the 5GC entity (600). Below is from 3GPP 36.331, v15.6.0: SIB1 content:

If the first neighbor cell and the second neighbor cell are connected to one of the 5GC (600) and the EPC (700), then the measurement report handler (460) splits the measurement report and sends the measurement report for the second neighbor cell connected to the EPC (700) after sending the measurement report for the first neighbor cell connected to the 5GC entity (600). If the first neighbor cell and the second neighbor cell are not connected to one of the 5GC entity (600) and the EPC (700), then the measurement report handler (460) shares the measurement report.

According to another embodiment of the disclosure, the processor (410) receives the measurement configuration and detects the at least one neighbor cell from the received measurement configuration.

The processor (410) acquires the SIB 1 type message from the at least one neighbor cell among the plurality of

```
PLMN-IdentityList-r15 : : =           SEQUENCE (SIZE (1 .. maxPLMN-r11)) OF PLMN-IdentityInfo-r15
PLMN-IdentityInfo-r15 : : =           SEQUENCE {
    plmn-Identity-5GC-r15                 CHOICE{
        plmn-Identity-r15                     PLMN-Identity,
        plmn-Index-r15                        INTEGER (1 .. maxPLMN-r11)
    },
    cellReservedForOperatorUse-r15        ENUMERATED {reserved, notReserved},
    cellReservedForOperatorUse-CRS-r15    ENUMERATED {reserved, notReserved}
}
```

The serving cell may be a NR cell and the at least one neighbor cell is an LTE cell.

The serving cell may be an mmw cell (220) and the at least one neighbor cell may be a sub6 cell (210).

If the at least one neighbor cell is connected with the 5GC entity (600) then, the processor (410) maintains a current configuration of the serving cell. If the at least one neighbor cell is not connected with the 5GC entity (600) then, the 5GC connection determiner (450) adds the offset to the measurement quantity threshold of the serving cell. The offset may be a configurable value and may be controlled based on a threshold set by the wireless communication system (4000).

According to another embodiment of the disclosure, if the at least one neighbor cell is connected with the 5GC entity (600) then, the measurement report handler (460) adds the offset to time to trigger the measurement report of the serving cell. If the at least one neighbor cell is not connected with the 5GC entity (600) then, the processor (410) maintains the current configuration of the serving cell.

The processor (410) detects that the reporting criteria is met based on the determination. The measurement report handler (460) determines whether a measurement identifier of the first neighbor cell from the at least one neighbor cell is different from a measurement identifier of the second neighbor cell from the at least one neighbor cell.

If the measurement identifier of the first neighbor cell from the at least one neighbor cell is different from the measurement identifier of the second neighbor cell from the at least one neighbor cell then, the measurement report handler (460) sends the measurement report for the second neighbor cell connected to the EPC (700) after sending the measurement report for the first neighbor cell connected to the 5GC entity (600).

If the measurement identifier of the first neighbor cell from the at least one neighbor cell is different from the measurement identifier of the second neighbor cell from the at least one neighbor cell then, the measurement report handler (460) determines whether the first neighbor cell and the second neighbor cell are connected to one of the 5GC (600) and the EPC (700).

neighbor cells (500). The processor (410) identifies that the at least one neighbor cell supports the CN connectivity based on the acquired SIB 1 type message. The processor (410) determines whether the required data rate is more than a threshold. If the required data rate is more than the threshold, then the processor (410) performs operations illustrated in FIG. 5BA, 5BB, FIG. 5CA, or FIG. 5CB. If the required data rate is more than the threshold then, the processor (410) follows the current measurement reporting procedure as per 3GPP.

According to another embodiment of the disclosure, initially, the UE (400) is in a source SeNB configured with the 5CG (600). The processor (410) acquires the measurement configuration and detects that at least one neighbor cell supports the reporting criteria based on the acquired measurement configuration. The processor (410) ranks at least one neighbor cell in response to detecting that at least one neighbor cell supports the reporting criteria. The EN-DC support determiner (440) determines whether the at least one ranked neighbor cell supports the EN-DC based on the reporting criteria.

If the at least one ranked neighbor cell supports the EN-DC, then the EN-DC support determiner (440) starts the timer for a first neighbor cell from the at least one ranked neighbor cell and delay to send the measurement report of the first cell until the timer is expired.

If the at least one ranked neighbor cell does not support the EN-DC, then the processor (410) updates the information related to the at least one ranked neighbor cell supporting the EN-DC in the memory (430) and sends the measurement report with the event for the reporting criteria. The EN-DC support determiner (440) determines whether the second neighbor cell of at least one ranked neighbor cell supports the ENDC when the first neighbor cell of the at least one ranked neighbor cell does not support EN-DC.

If the second neighbor cell of the at least one ranked neighbor cell does not support the ENDC when first neighbor cell from at least one ranked neighbor cell does not support EN-DC, then the processor (410) determines the expiration of the timer for the first neighbor cell pf the at least one neighbor cell and send the measurement report of the first cell upon the expiration of the timer.

If the second neighbor cell of the at least one ranked neighbor cell supports the ENDC when the first neighbor cell of the at least one ranked neighbor cell does not support EN-DC, then the EN-DC support determiner (440) determines whether the second neighbor cell supports the EN-DC using the SIB 2 type message.

If the second neighbor cell does not support the EN-DC using the SIB 2 type message, then the EN-DC support determiner (440) determines whether the Reference Signal Received Power (RSRP)/Reference Signal Received Quality (RSRQ) of the second cell along with threshold is greater than the first cell. If the RSRP/RSRQ of the second cell along with threshold is not greater than the first cell, then the processor (410) starts the second timer for the second neighbor cell from the at least one ranked neighbor cell and evaluating RSRP/RSRQ of the second cell along with the threshold is greater than the first cell.

In an example, the UE (400) monitors the configured cells and compares the reporting quantity (i.e., RSRP/RSRQ) against the measurement report criteria. If the UE (400) finds the measurement quantity satisfying the reporting criteria, the UE (400) should report the MR with the cell details and the measured values. Based on the proposed methods, when neighbor cell event A3 or A5 is triggered, the UE (400) reads the SIB2 of the cell measured to find out the 5G NR support information. The UE (400) updates the memory (430) for the specific cell with the 5G NR support information based on the value in the SIB.

Considering Event A3 is satisfied for the neighbor cell and based on the proposed methods, the UE (400) has read the support of the ENDC support from the SIB2 message before the trigger of event A5, then if the neighbor cell supports ENDC/5G NR, the UE (400) sends the measurement report for event A5 immediately. In this scenario, there will be no delay in the handover because the EN-DC capability will be read during the trigger of A3.

Based on this measurement report, the base station will handover UE (400) to an ENDC supported LTE cell, or else the base station postpones the handover by the timer and goes to the next measurement object to repeat the same. When the measurement report is sent, the memory (430) created for learning is also updated with the 5G NR support info of the neighbor cells, which can be useful for further handovers where local database information can be used if already available. The timer is a UE implemented learning based timer, which shall have different values based on the parameters like serving cell signal level, handover failure rate, BLER etc. In an example, if the serving cell is very weak, it is not good to postpone for a long time as there is a risk of losing service. Hence the timer shall be configured with different values based on different signals—near cell, mid cell or far cell. Further, the memory (430) can store many information. The many information may be, but is not limited to, a SIB2 ENDC support, GPS coordinates, EARFCN&PCI, Tracking area code, MCC/MNC, time of storage, operator name or the like.

The processor (410) is configured to execute instructions stored in the memory (430) and to perform various processes. The communicator (420) is configured for communicating internally between internal hardware components and with external devices via one or more networks.

The memory (430) also stores instructions to be executed by the processor (410). The memory (430) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (430) may, in some examples, be considered a non-transitory storage medium. The term "non-transitory" may indicate that the storage medium is not embodied in a carrier wave or a propagated signal. However, the term "non-transitory" should not be interpreted that the memory (430) is non-movable. In some examples, the memory (430) can be configured to store larger amounts of information than the memory. In certain examples, a non-transitory storage medium may store data that can, over time, change (e.g., in Random Access Memory (RAM) or cache).

Below are various methods to decode SIB1 of neighbor cell in the connected state:
  During measurement gap related procedure, and
  Without measurement gaps.

During measurement gap related procedure: Use measurement gaps to decode the SIB1 of neighbor cell and standard TS 36.133 provides minimum requirements to have a valid measurement of the neighbour cell. This is the minimum requirement and all UEs (400) typically require much less time to have a valid measurement for the cell. In an example, the UE (400) takes time in acquiring downlink (DL) synchronize with a neighbour cell i.e. Primary synchronization signal (PSS), a secondary synchronization signal (SSS) acquisition of neighbour cell. Once the DL sync is established, the UE (400) has to tune to the target frequency and decode/measure the required reference signals in order to make measurements. Therefore, when there are frequent measurement gaps (every 40 ms or 80 ms in LTE), the UE (400) can use an intermittent measurement gap to acquire SIB1 of the detected neighbour cells.

Without measurement gaps-when Connected Mode-Discontinuous Reception (C-DRX) is configured: The UE (400) does not monitor downlink channels during DRX sleep duration and hence does not receive any data during this time. The UE (400) can utilize the C-DRX sleep duration in order to read target cell SIB1 to verify the connected CN type. Since there will be fewer neighbour cells meeting the measurement report criteria at a time, and SIB1 has to be acquired only once, the UE may not go to sleep state for 1 or 2 DRX cycles (based on the DRX length—typically 40 ms for VoLTE, >100 ms for non-VoLTE cases normally).

Without measurement gaps-by using autonomous gaps: LTE already has the provision to utilize autonomous gaps. In this case, the gaps are decided autonomously by the UE (400) and no configuration is received from the network. For the case where SIB1 of target cell has to be detected, the UE (400) may utilize such autonomous gaps. The UE (400) can choose random periods where the data activity less and chose to tune to target cell for a short duration. Typically, the ideal periods are chosen based on the UE data activity. In an example, if UL BSR is 0, the UE (400) can assume there is no UL data. If DL scheduling rate is low, then there is very less DL data from network. Such ideal time periods can be selected for reading SIB1. Since the DL data activity is expected to be less, they can easily be recovered using HARQ retransmissions with seamless impact to user service or power consumption.

Without measurement gaps—switching one Rx antenna: There are designs and devices where the neighbour cell SIB and paging are monitored for a neighbour cell/RAT which in connected state in LTE cell e.g., SRLTE, SRDS etc. These mechanism can be utilized in order to detect the connected CN type of target/neighbour cell (From SIB1). All devices (except for MTC/IoT devices) cove with support of diversity antenna support (to support MIMO). All the devices have a primary Rx antenna and a secondary Rx antenna. The Primary RX is coupled with Tx antenna (transceiver) and secondary is Rx alone on most cases. In such cases, the secondary Rx can be switched to target cell during its SIB1 occasion in order to detect the connected CN type.

Without measurement gaps—When camped on FR2 NR cell, Since the operational frequency of LTE and NR FR2 are wide apart in spectrum, they are normally handled using different RF elements. These mechanism can be utilized in order to detect the connected CN type of target/neighbour cell (From SIB1). Hence, when UE is connected to NR FR2 cell, neighbour LTE SIB1 can be detected using the other RF (RF used for LTE and NR FR1 communication).

The method can be extended to prioritize the handover from EUTRA_EPC to EUTRA_5GC, NR_EPC to NR_5GC, and NR_5GC and EUTRA_5GC.

Although FIG. 4 shows an overview of the wireless communication system (4000), but it is to be understood that other embodiments are not limited thereon. In other embodiments, the wireless communication system (4000) may include less or more number of components. Further, the labels or names of the components are used only for illustrative purpose and does not limit the scope of the disclosure.

Figure 5A:
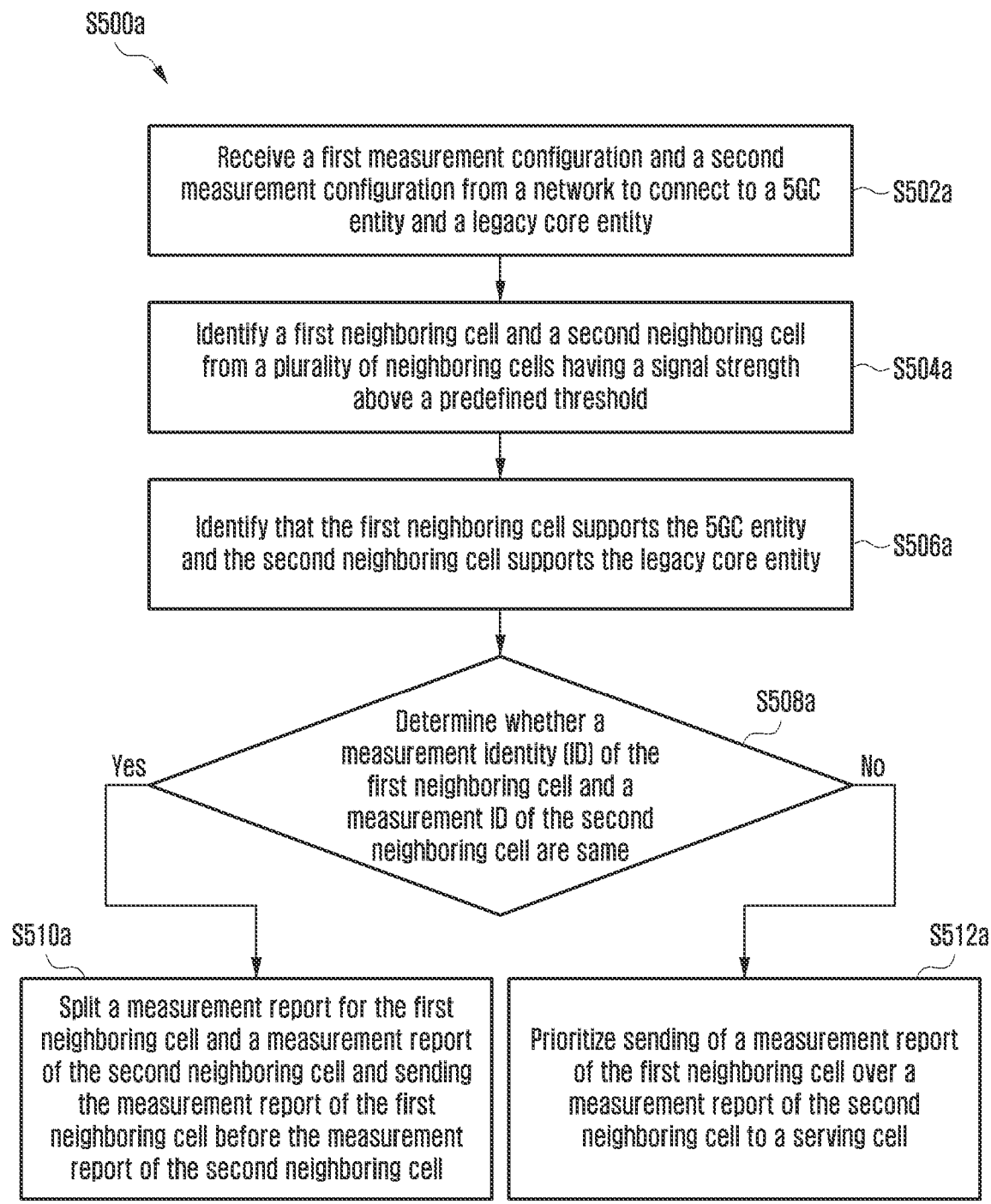
FIG. 5A is a flow chart illustrating various operations for handling handover in the wireless communication system, according to an embodiment of the disclosure.

FIG. 5A is a flow chart (S500a) illustrating various operations for handling handover in the wireless communication system (4000), according to an embodiment of the disclosure.

Referring to FIG. 5A, the operations S502a to S512a are performed by the processor (410). At operation S502a, the first measurement configuration and the second measurement configuration is received from the network to connect to the next generation core and the legacy core entity. The first measurement configuration and the second measurement configuration may be received over the RRC message.

At operation S504a, the first neighboring cell and the second neighboring cell are identified from the plurality of neighboring cells having the signal strength above the predefined threshold. At operation S506a, the first neighboring cell is identified as supporting the next generation core and the second neighboring cell is identified as supporting the legacy core entity.

If the next generation core is a sixth generation cell (6g), then the legacy core entity is one of a 5G cell, a 4G cell, a 3G cell, 2G cell and a CDMA cell. If the next generation core is a fifth generation cell (5g), then the legacy core entity is one of a 4G cell, a 3G cell, 2G cell and a CDMA cell.

The predefined threshold may be configured by the wireless communication system (4000) or the UE (400).

The first neighboring cell supporting the next generation core and the second neighboring cell supporting the legacy core entity may be identified by acquiring the SIB 1 type message from the first measurement configuration and the second measurement configuration. The SIB 1 type message includes a list of PLMNs that is connected to the next generation core or the legacy core entity.

At operation S508a, it is determined whether the measurement ID of the first neighboring cell and a measurement ID of the second neighboring cell are same.

If the measurement ID of the first neighboring cell and the measurement ID of the second neighboring cell are the same, then at operation S510a, the measurement report for the first neighboring cell and the measurement report of the second neighboring cell are split and the measurement report of the first neighboring cell is sent before the measurement report of the second neighboring cell.

The measurement report for the first neighboring cell and the measurement report of the second neighboring cell may be split by one of adding the offset to the measurement quantity threshold of the first neighboring cell, and adding the offset to timer to trigger the measurement report of the second neighboring cell.

The measurement report for the first neighboring cell and the measurement report of the second neighboring cell may be split by creating a separate measurement report for a legacy cell and delaying sending of the measurement report after the next generation core.

If the measurement ID of the first neighboring cell and the measurement ID of the second neighboring cell are different, then at operation S512a, the sending of the measurement report of the first neighboring cell is prioritized over sending the measurement report of the second neighboring cell to the serving cell.

The sending of the measurement report of the first neighboring cell may be prioritized over the measurement report of the second neighboring cell to the serving cell by one of adding an offset to the measurement quantity threshold of the first neighboring cell, and adding the offset to time to trigger the measurement report of the second neighboring cell.

Figure 5B:
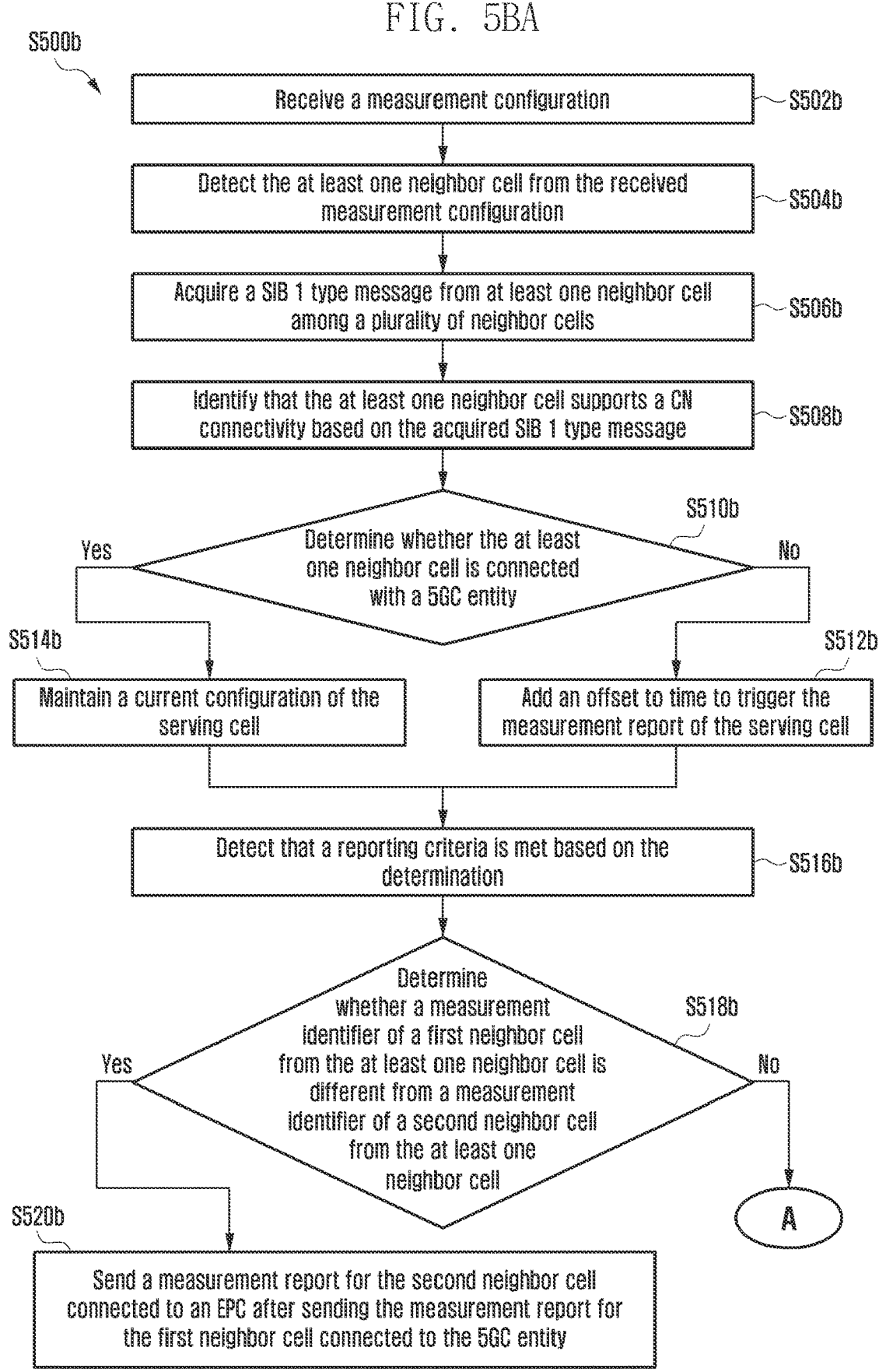
FIGS. 5BA and 5BB are example flow chart illustrating various operations for handling handover in the wireless communication system by providing additional delay to time to trigger the handover, according to various embodiments of the disclosure.
Figure 5B:
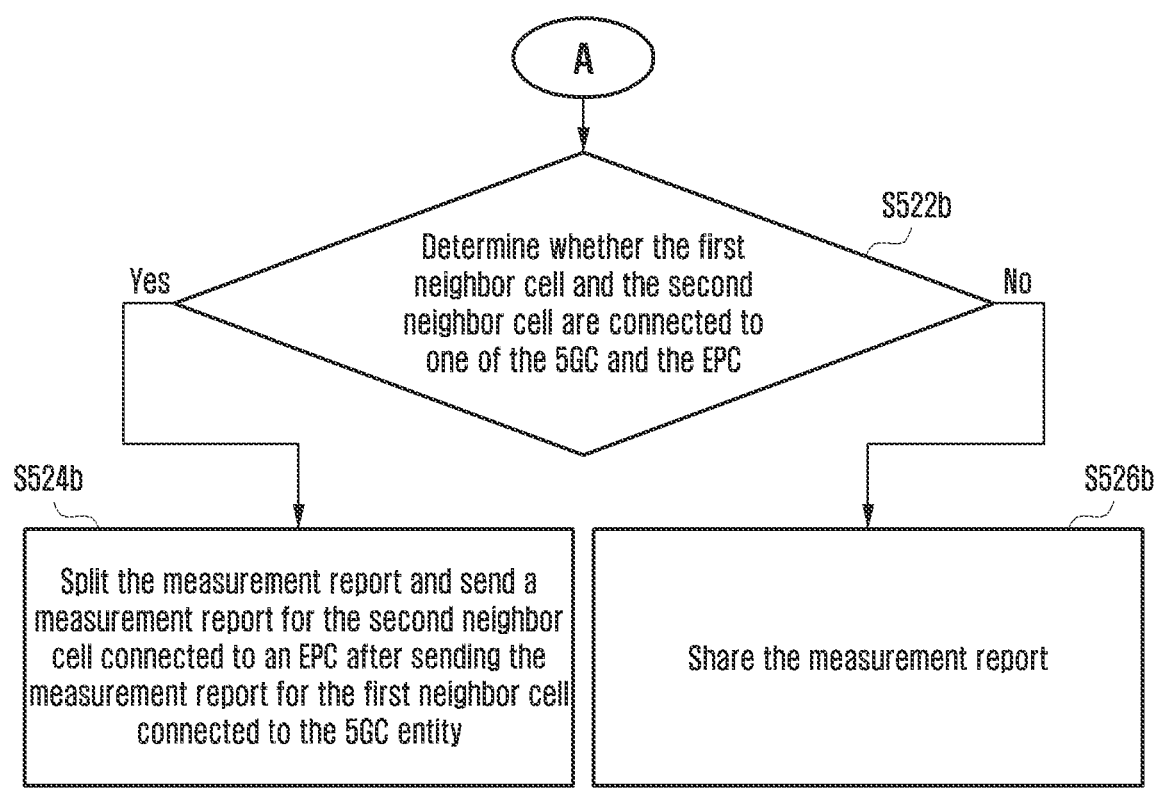

FIGS. 5BA and 5BB an example flow chart (S500b) illustrating various operations for handling handover in the wireless communication system (4000) by providing additional delay to time to trigger the handover, according to various embodiments of the disclosure.

Referring to FIGS. 5BA and 5BB, The operations S502 to S526 are performed by the processor (410).

Referring to FIG. 5BA, at operation S502b, the measurement configuration is received. At operation S504b, the at least one neighbor cell is detected from the received measurement configuration. At operation S506b, the SIB 1 type message is acquired from at least one neighbor cell among the plurality of neighbor cells (500). At operation S508b, at least one neighbor cell is identified as supporting the CN connectivity based on the acquired SIB 1 type message. At operation S510b, it is determined determining whether the at least one neighbor cell is connected with the 5GC entity (600).

If the at least one neighbor cell is connected with the 5GC entity (600), then at operation S512b, the offset is added to the time to trigger the measurement report of the serving cell.

If the at least one neighbor cell is not connected with the 5GC entity (600), then at operation S514b, the current configuration of the serving cell is maintained.

At operation S516b, it is detected that the reporting criteria is met based on the determination. At operation S518b, it is determined whether a measurement identifier of the first neighbor cell from the at least one neighbor cell is different from a measurement identifier of the second neighbor cell from the at least one neighbor cell. If the measurement identifier of the first neighbor cell from the at least one neighbor cell is different from the measurement identifier of the second neighbor cell from the at least one neighbor cell, then at operation S520b, the measurement report for the second neighbor cell connected to the EPC (700) is sent after sending the measurement report for the first neighbor cell connected to the 5GC entity (600).

Referring to FIG. 5BB, if the measurement identifier of the first neighbor cell from the at least one neighbor cell is different from the measurement identifier of the second neighbor cell from the at least one neighbor cell, then at operation S522b, it is determined whether the first neighbor cell and the second neighbor cell are connected to one of the 5GC entity (600) and the EPC (700).

If the first neighbor cell and the second neighbor cell are connected to one of the 5GC entity (600) and the EPC (700), then at operation S524b, the measurement report is split and the measurement report for the second neighbor cell connected to the EPC (700) is sent after sending the measurement report for the first neighbor cell connected to the 5GC entity (600). If the first neighbor cell and the second neighbor cell are not connected to one of the 5GC entity (600) and the EPC (700), then at operation S526b, the measurement report is shared.

Figure 5C:
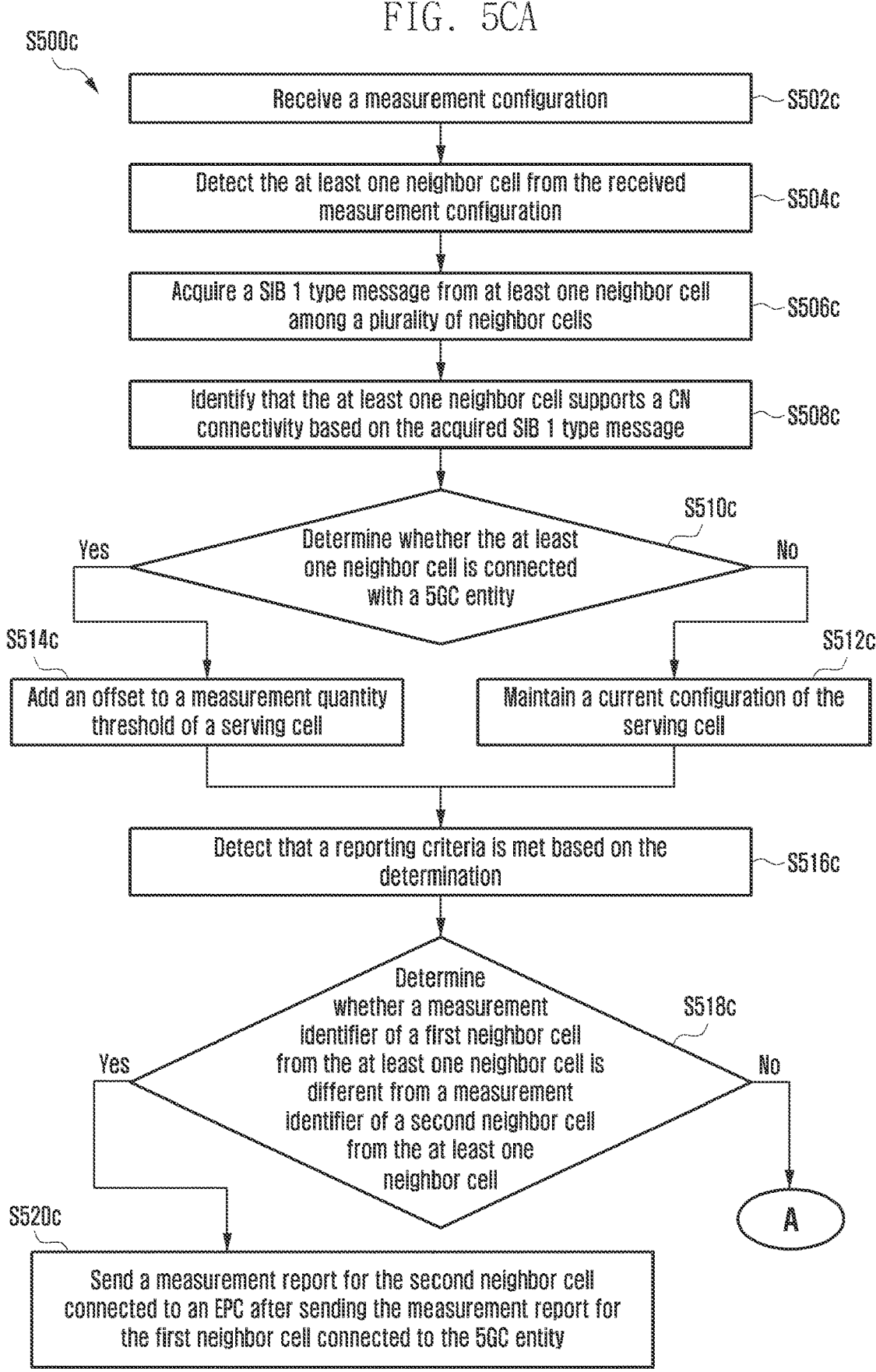
FIGS. 5CA and 5CB are example flow chart illustrating various operations for handling handover in the wireless communication system by adding offset to threshold, according to various embodiments of the disclosure.
Figure 5C:
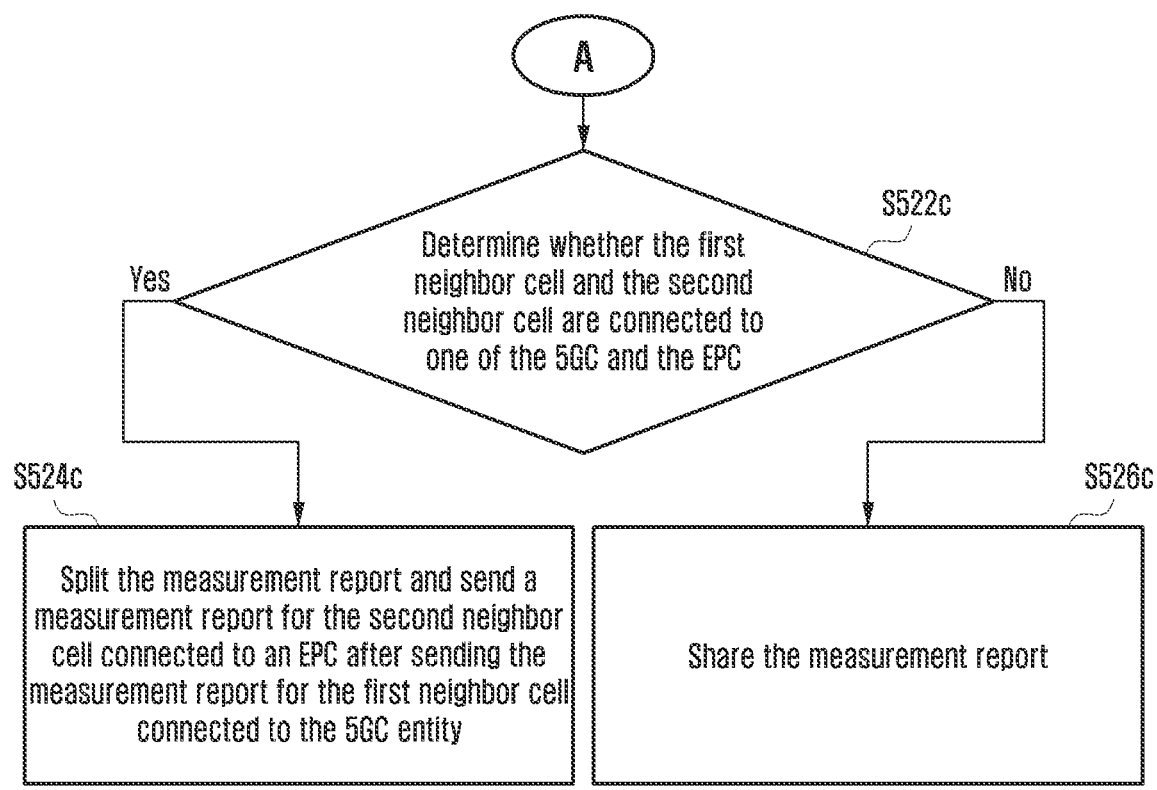

FIGS. 5CA and 5CB are example flow chart (S500c) illustrating various operations for handling handover in the wireless communication system (4000) by adding offset to threshold, according to various embodiment of the disclosure.

Referring to FIGS. 5CA and 5CB, the operations S502c to S526c are performed by the processor (410).

Referring to FIG. 5CA, At operation S502c, the measurement configuration is received. At operation S504c, the at least one neighbor cell is detected from the received measurement configuration. At operation S506c, the SIB 1 type message is acquired from at least one neighbor cell among the plurality of neighbor cells (500). At operation S508c, the at least one neighbor cell is identified as supporting the CN connectivity based on the acquired SIB 1 type message. At operation S510c, it is determined whether the at least one neighbor cell is connected with the 5GC entity (600).

If the at least one neighbor cell is connected with the 5GC entity (600) then, at operation S512c, then a current configuration of the serving cell is maintained. If the at least one neighbor cell is not connected with the 5GC entity (600) then, at operation S514c, then the offset is added to the measurement quantity threshold of the serving cell.

At operation S516c, it is detected that the reporting criteria is met based on the determination. At operation S518c, it is determined whether a measurement identifier of the first neighbor cell from the at least one neighbor cell is different from a measurement identifier of the second neighbor cell from the at least one neighbor cell. If the measurement identifier of the first neighbor cell from the at least one neighbor cell is different from the measurement identifier of the second neighbor cell from the at least one neighbor cell then, at operation S520c, the measurement report for the second neighbor cell connected to the EPC (700) is sent after sending the measurement report for the first neighbor cell connected to the 5GC entity (600).

Referring to FIG. 5CB, if the measurement identifier of the first neighbor cell from the at least one neighbor cell is different from the measurement identifier of the second neighbor cell from the at least one neighbor cell, then at operation S522c, it is determined whether the first neighbor cell and the second neighbor cell are connected to one of the 5GC entity (600) and the EPC (700).

If the first neighbor cell and the second neighbor cell are connected to one of the 5GC entity (600) and the EPC (700), then at operation S524c, the measurement report is split and the measurement report for the second neighbor cell connected to the EPC (700) is sent after sending the measurement report for the first neighbor cell connected to the 5GC entity (600). If the first neighbor cell and the second neighbor cell are not connected to one of the 5GC entity (600) and the EPC (700), then at operation S526c, the measurement report is shared.

The proposed method, explained in FIGS. 5A to 5CB, can be extended when the measurements are performed for IRAT (NR→LTE, WCDMA/GSM→LTE etc) in cases of SA NR, SA LTE and NSA. This is applicable when the measurements are performed for intra LTE scenarios.

Figure 6:
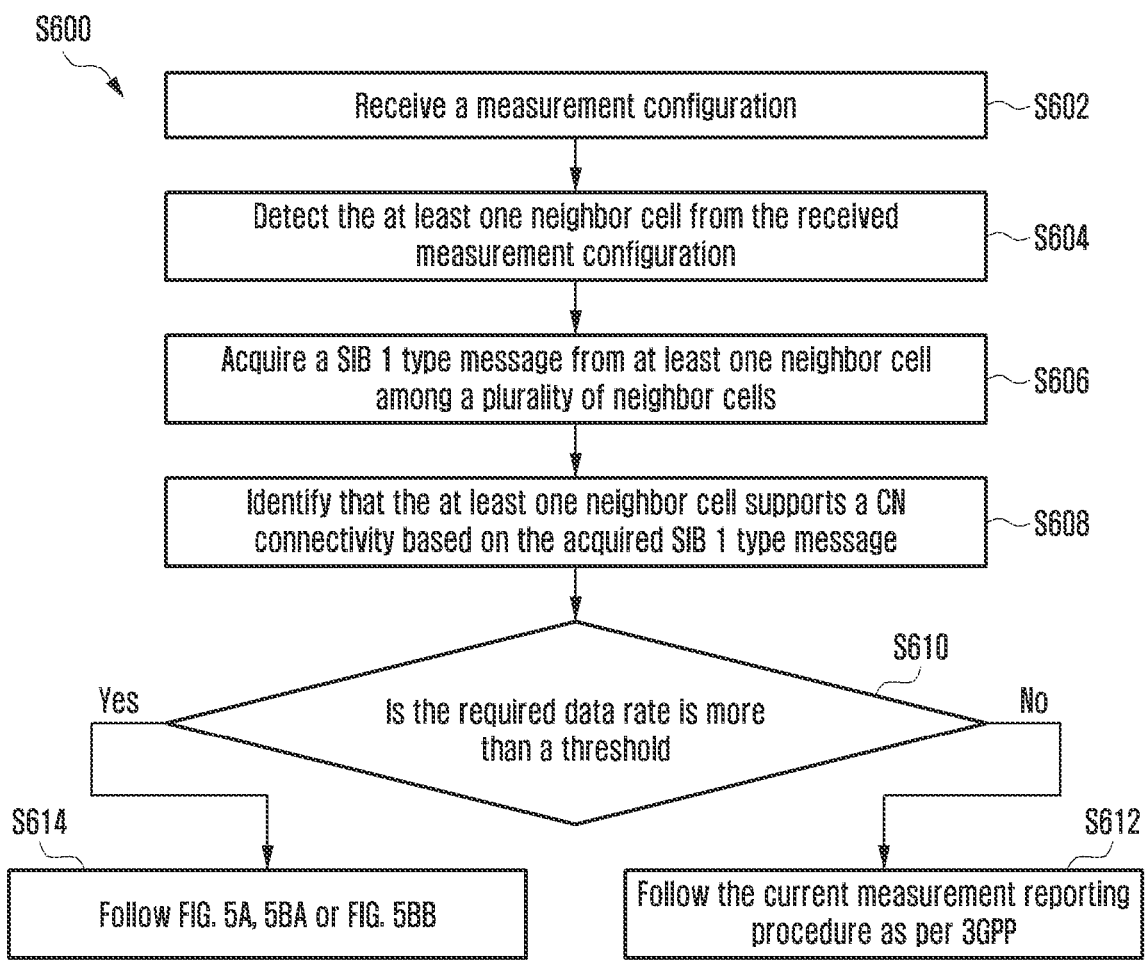
FIG. 6 is a flow chart illustrating various operations for handling handover in the wireless communication system by considering the data rate, according to an embodiment of the disclosure.

FIG. 6 is a flow chart (S600) illustrating a method for handling handover in the wireless communication system (4000) by considering the data rate, according to an embodiment of the disclosure.

Referring to FIG. 6, the operations S602 to S614 are performed by the processor (410).

At operation S602, the measurement configuration is received. At operation S604, the at least one neighbor cell is detected from the received measurement configuration. At operation S606, the SIB 1 type message is acquired from the at least one neighbor cell among the plurality of neighbor cells (500). At operation S608, the at least one neighbor cell is identified as supporting the CN connectivity based on the acquired SIB 1 type message. At operation S610, it is determined whether the required data rate is more than a threshold. If the required data rate is more than the threshold, then at operation S614, the method follows the operations shown in FIG. 5BA, FIG. 5BB, or FIG. 5CB. If the required data rate is not more than the threshold then, at operation S612, the method follows the current measurement reporting procedure as per 3 GPP.

Figure 7:
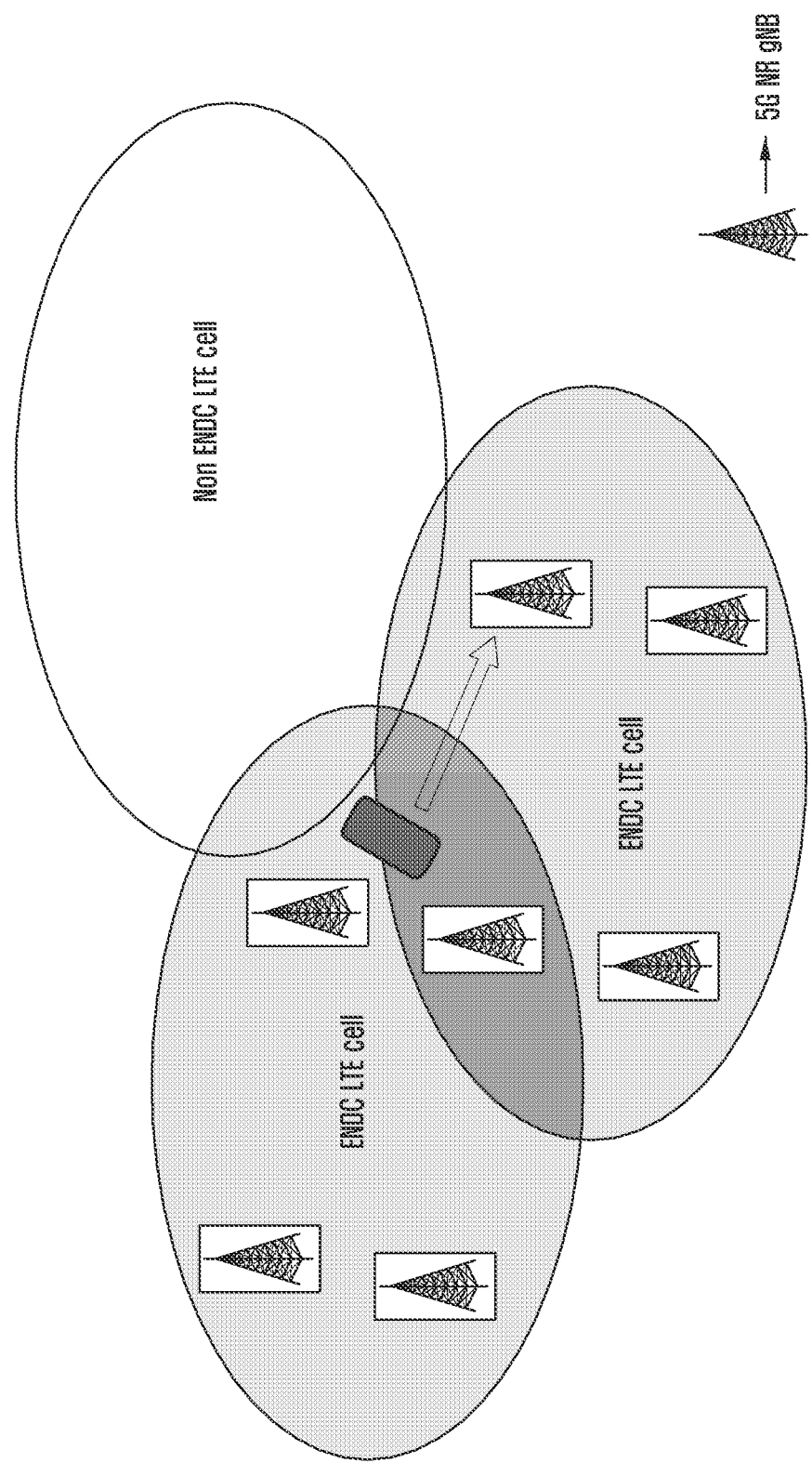
FIG. 7 is an example scenario in which the UE will move from an ENDC cell to a Non-ENDC cell while playing/downloading high definition video, according to an embodiment of the disclosure.

FIG. 7 is an example scenario in which a UE (400) will move from ENDC cell (connected to 4G+5G) to another Non-ENDC cell while playing/downloading high definition video, according to an embodiment of the disclosure.

Referring to FIG. 7, the UE (400) will move from ENDC cell (connected to 4G+5G) to another ENDC cell while playing/downloading HD video. As the new target cell also supports ENDC, 5G SCG (800) can be immediately added and there will be no data interruptions. The method can be used to monitor the LTE measurement events for neighbor cells and prioritize the ENDC cells over non-ENDC cells, so that the proposed method ensures that the UE (400) can continue the 5G service on the target cell, considering the UE (400) is in a 5G area.

Figure 8A:
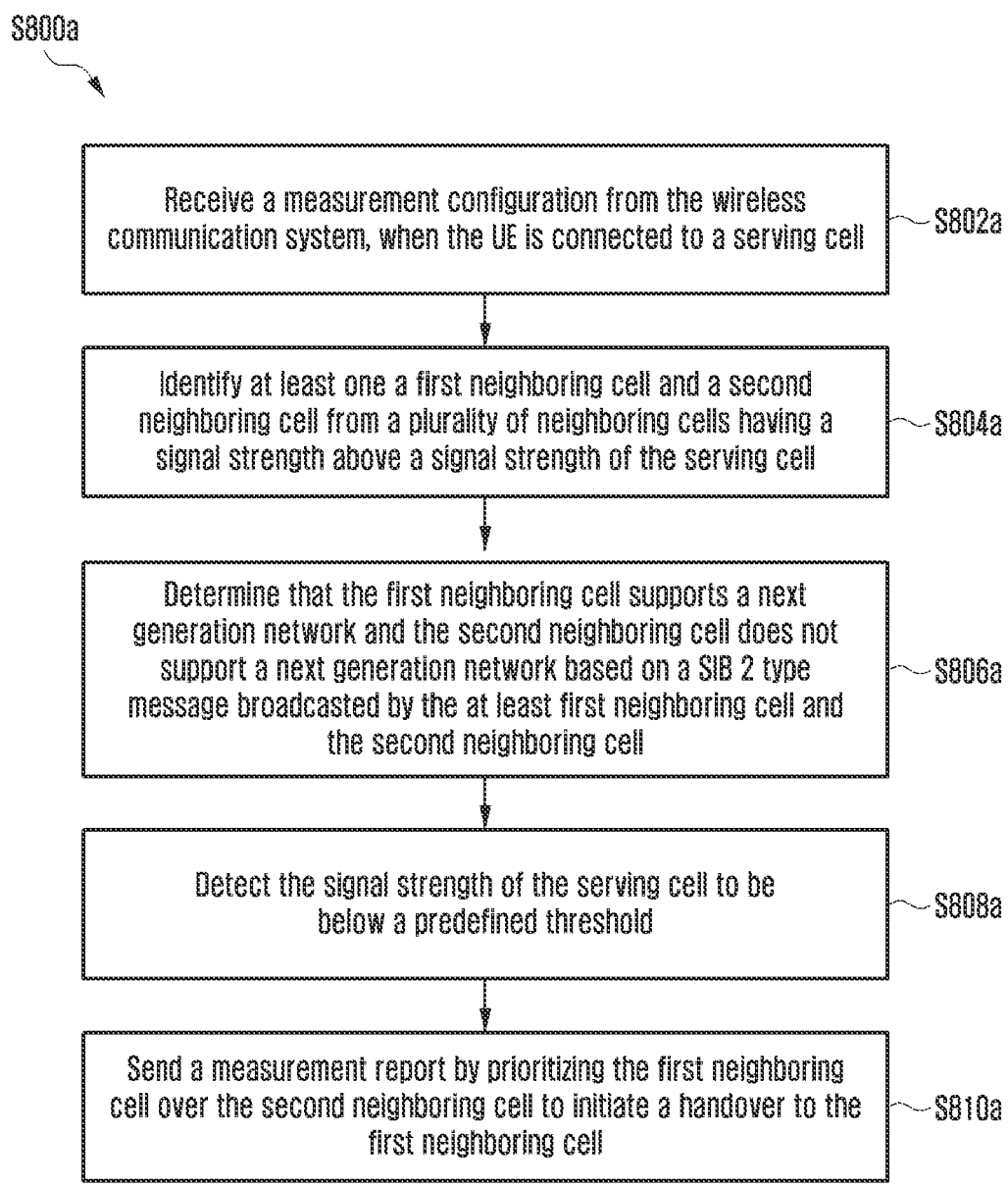
FIG. 8A is another flow chart illustrating various operations for handling handover in the wireless communication system, according to an embodiment of the disclosure.

FIG. 8A is a flow chart (S800a) illustrating various operations for handling handover in the wireless communication system (4000) by using SIB2 reading procedure in a connected mode, according to an embodiment of the disclosure.

Referring to FIG. 8A, the operations S802a to S810a are performed by the processor (410).

At operation S802a, the measurement configuration from the wireless communication system (4000) is received, when the UE (400) is connected to a serving cell. The serving cell can be, for example, but not limited to the LTE cell and the 5G cell.

At operation S804a, at least one of a first neighboring cell and a second neighboring cell are identified from a plurality of neighboring cells having the signal strength above the signal strength of the serving cell. The at least one of the first neighboring cell and the second neighboring cell having the signal strength is identified above the signal strength of the serving cell based on a A3 event configured by the wireless communication system (4000).

At operation S806a, it is determined that the first neighboring cell supports the next generation network and the second neighboring cell does not support the next generation network based on a SIB 2 type message broadcasted by the at least first neighboring cell and the second neighboring cell. At operation S808a, the signal strength of the serving cell is detected to be below a pre-defined threshold. The signal strength of the serving cell to be below the pre-defined threshold may be detected based on an A5 event configured by the wireless communication system (4000).

At operation S810*a*, the measurement report is sent by prioritizing the first neighboring cell over the second neighboring cell to initiate a handover to the first neighboring cell.

The method may include updating an information related to the first neighboring cell supporting the next generation network in the memory (430) when the first neighboring cell supports the next generation network.

The method may include starting the timer for the first neighbor cell and delaying to send the measurement report of the first neighbor cell until the timer expires, when the first neighboring cell does not support the next generation network.

The method may include determining whether the second neighbor cell supports the next generation network when the first neighbor cell does not support the next generation core. If the second neighbor cell supports the next generation network, the method may include updating information indicating that the second neighbor cell supports the next generation network and sending a measurement report. If the second neighbor cell does not support the next generation network then, the method may include starting the timer for a third neighbor cell and delaying to send the measurement report of the third neighboring cell until the timer expires.

Figure 8B:
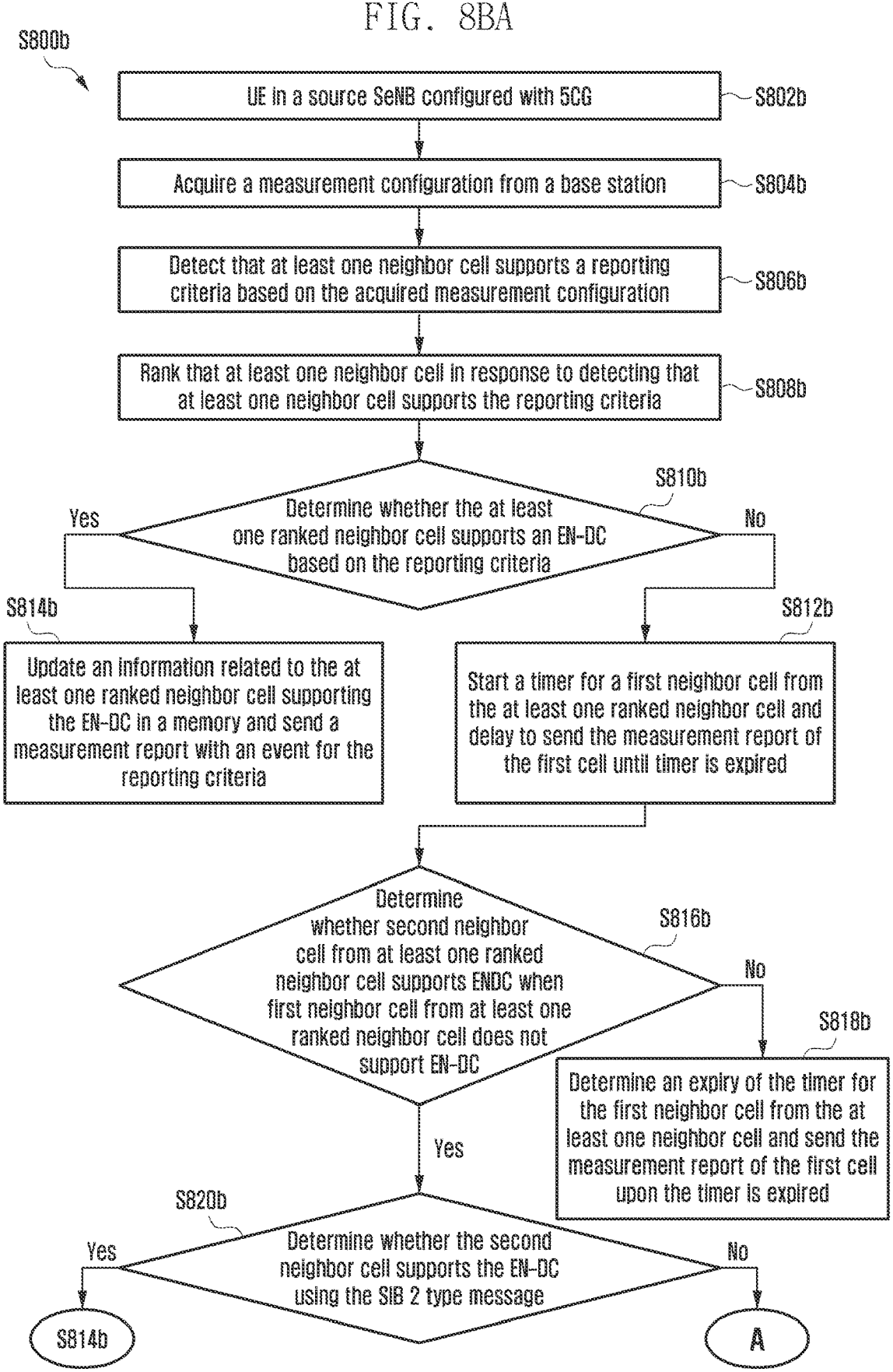
FIGS. 8BA and 8BB are example flow chart illustrating various operations for handling handover in the wireless communication system by using an event management with a threshold evaluation, according to various embodiments of the disclosure.
Figure 8B:
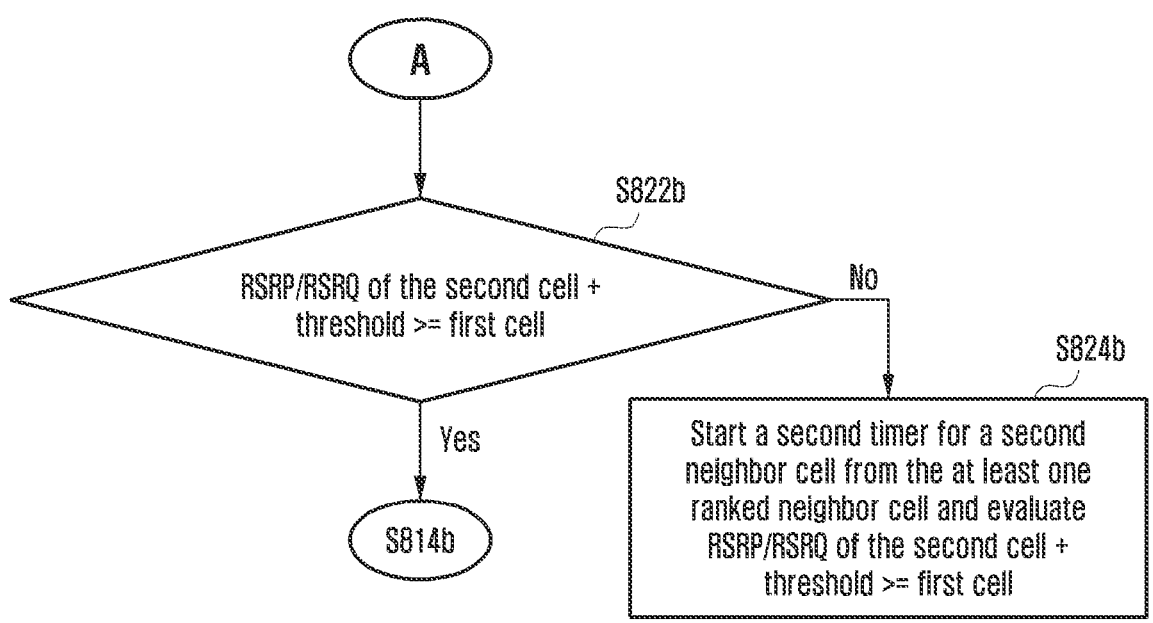

FIGS. 8BA and 8BB are example flow chart (S800*b*) illustrating various operations for handling handover in the wireless communication system (4000) by using the event management with the threshold evaluation, according to various embodiments of the disclosure. Referring to FIGS. 8BA and 8BB, the operations S802*b* to S818*b* are performed by the processor (410).

At operation S802*b*, the UE (400) is in the source SeNB configured with the 5CG entity (600). At operation S804*b*, the measurement configuration is acquired from the base station. At operation S806*b*, it is detected that the at least one neighbor cell supports the reporting criteria based on the acquired measurement configuration. At operation S808*b*, the at least one neighbor cell is ranked in response to detecting that at least one neighbor cell supports the reporting criteria. At operation S810*b*, it is determined whether the at least one ranked neighbor cell supports the EN-DC based on the reporting criteria.

If the at least one ranked neighbor cell supports the EN-DC, then at operation S812*b*, the timer for the first neighbor cell of the at least one ranked neighbor cell is started and the sending of the measurement report of the first cell is delated until the timer expires.

If the at least one ranked neighbor cell does not support the EN-DC, then at operation S814*b*, the information related to the at least one ranked neighbor cell supporting the EN-DC is updated and stored in the memory (430) and the measurement report with the event for the reporting criteria is sent. At operation S816*b*, it is determined whether the second neighbor cell from the at least one ranked neighbor cell supports the ENDC when first neighbor cell from at least one ranked neighbor cell does not support EN-DC.

If the second neighbor cell from the at least one ranked neighbor cell does not support the ENDC when the first neighbor cell from at least one ranked neighbor cell does not support EN-DC, then at operation S818*b*, the expiration time of the timer for the first neighbor cell of the at least one neighbor cell is determined and the measurement report of the first cell is sent upon expiration of the timer.

If the second neighbor cell from the at least one ranked neighbor cell supports the ENDC when first neighbor cell from at least one ranked neighbor cell does not support EN-DC, then at operation 820*b*, it is determined whether the second neighbor cell supports the EN-DC using the SIB 2 type message.

If the second neighbor cell supports the EN-DC using the SIB 2 type message then, the method follows the operation S814*b*.

If the second neighbor cell does not support the EN-DC using the SIB 2 type message, then at operation S822*b*, it is determined whether the RSRP/RSRQ of the second cell along with threshold is greater than the first cell.

If the RSRP/RSRQ of the second cell along with threshold is greater than the first cell then, method returns to operation S814*b*.

If the RSRP/RSRQ of the second cell along with threshold is not greater than the first cell, then at operation S824*b*, the method includes starting the second timer for the second neighbor cell from the at least one ranked neighbor cell and evaluating RSRP/RSRQ of the second cell along with the threshold is greater than the first cell.

The proposed method can be used to maximize the chances to maintain the service continuity on 5G NR when a user of the UE (400) is already on the NR session. The proposed method can be used to maintain a balance in NR service continuity and user maintaining an active connection without dropping the existing connection. The timers added in the proposed method are based on analytical data. The method can be used to improve the user experience with a NR connection since the UE (400) allows the user to stay on ENDC supported cell for maximum utilization of NR 5G. The proposed method can be used to ensure that the UE does not move to 5G/ENDC cell and stays on 4G only cell during handover if at all required during any scenario.

Figure 8C:
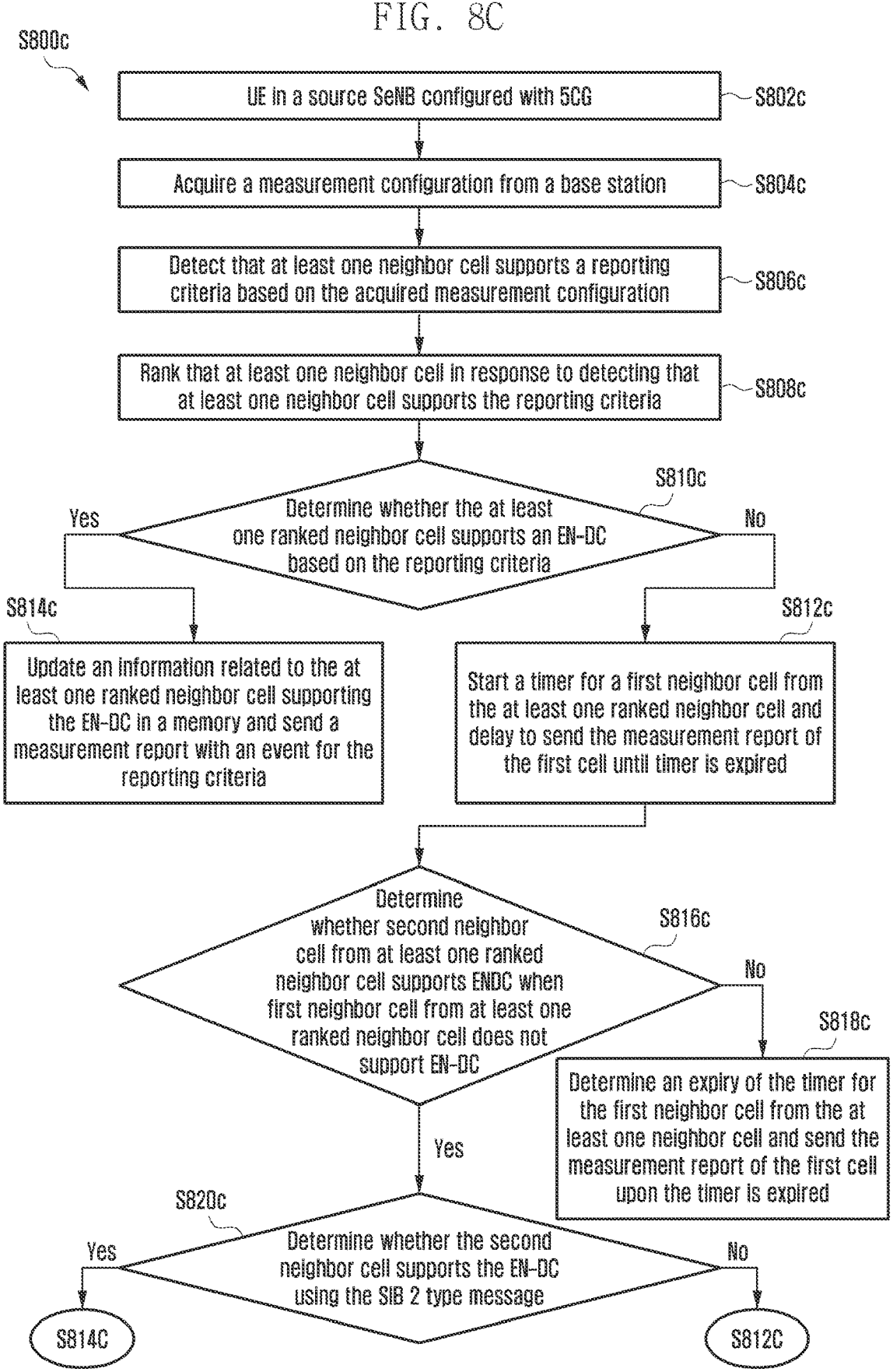
FIG. 8C is an example flow chart illustrating various operations for handling handover in the wireless communication system by using a SIB2 reading procedure in a connected mode, according to an embodiment of the disclosure.

FIG. 8C is an example flow chart (S800*c*) illustrating various operations for handling handover in the wireless communication system (4000) by using SIB2 reading procedure in the connected mode, according to an embodiment of the disclosure.

Referring to FIG. 8C, the operations S802*c* to S820*c* are performed by the processor (410).

At operation S802*c*, the UE (400) is in the source SeNB configured with the 5CG entity (600). At operation S804*c*, the measurement configuration is acquired from the base station. At operation S806*c*, it is detected that at least one neighbor cell supports the reporting criteria based on the acquired measurement configuration. At operation S808*c*, that at least one neighbor cell is ranked in response to detecting that at least one neighbor cell supports the reporting criteria. At operation S810*c*, it is determined whether the at least one ranked neighbor cell supports the EN-DC based on the reporting criteria.

If the at least one ranked neighbor cell supports the EN-DC then, at operation S812*c*, then the timer for the first neighbor cell of the at least one ranked neighbor cell is started and the sending of the measurement report of the first cell is delated until the timer expires.

If the at least one ranked neighbor cell does not support the EN-DC, then at operation S814*c*, the information related to the at least one ranked neighbor cell supporting the EN-DC is updated and stored in the memory (430) and the measurement report with the event for the reporting criteria is sent. At operation S816*c*, it is determined whether the second neighbor cell of the at least one ranked neighbor cell supports the ENDC when the first neighbor cell of at least one ranked neighbor cell does not support EN-DC.

If the second neighbor cell from the at least one ranked neighbor cell does not support the ENDC when the first neighbor cell from the at least one ranked neighbor cell does not support EN-DC, then at operation S818c, then the measurement report of the first cell is sent after the timer for the first neighbor cell from the at least one neighbor cell expires.

If the second neighbor cell from the at least one ranked neighbor cell supports the ENDC when first neighbor cell from at least one ranked neighbor cell does not support EN-DC, then at operation S820c, it is determined whether the second neighbor cell supports the EN-DC using the SIB 2 type message.

If the second neighbor cell supports the EN-DC using the SIB 2 type message then, the method returns to operation S814c.

If the second neighbor cell does not support the EN-DC using the SIB 2 type message then, the method returns to operation S812c.

In an example, different operators have different configurations. Some operators configure the neighbor cell report first (i.e., event A3), followed by serving & neighbor cell report (i.e., Event A5). Some operators configure serving & neighbor cell reports only (Event A5). For instance, in live network, when the base station configures UE (400) with only event A5 reporting, the neighbor cell reporting can be based on priorities maintained for 5G NR supported ENDC cells over non-ENDC cells. The checkpoint where neighbours are detected if they are actually ENDC supporting cells or not takes place when the measurement objects are configured. Based on the determination, the memory (430) is updated accordingly and the measurement reports are transmitted immediately when a cell is identified as an ENDC supported cell, or with a delay of time period Ti to provide priority to the other ENDC cells (if available). If there are NO ENDC cells available in the entire list configured by the base station, the UE (400) takes priority from the order of reporting quantity (best RSRP/RSRQ and prepares the priority list and reports accordingly) as per 3GPP. There are some operators who configure both Event A3 and Event A5. In this case, our proposal would consider verifying the support of ENDC availability in the phase where Event A3 criteria is met. This would be even more useful, because by the time decision for reporting Event A5 is done, the memory (430) would have already been updated with ENDC availability for every neighbor cell configured with. In general, the proposed methods provide priority for ENDC available/ENDC supported LTE cells over non-ENDC cells just to give the user a better experience and no data speed degradation, thereby maintaining the quality of service.

Based on the proposed methods, the UE (400) starts reading SIB2 of "configured neighbor cells" as soon as the UE (400) meets A3 reporting criteria, if the UE (400) are not already present in the memory (430). In this way the memory (430) can be updated much before the UE (400) meet A5 reporting criteria if configured by the base station. This results in saving the delay while ranking the neighbor cells in the order in which the cells have to be reported.

Figure 9:
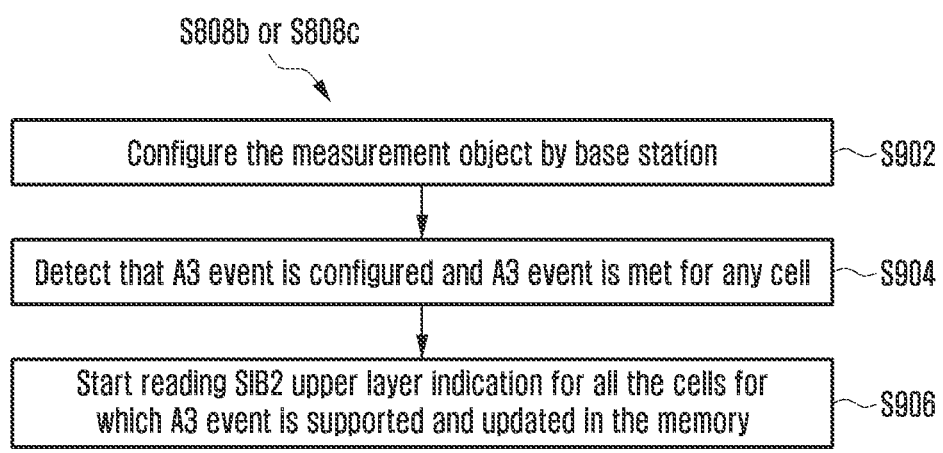
FIG. 9 is a flow diagram illustrating step by step processes for ranking that at least one neighbor cell in response to detecting that at least one neighbor cell supports the reporting criteria, according to an embodiment of the disclosure.

FIG. 9 is a flow diagram (S808b or S808c) illustrating step by step processes for ranking that at least one neighbor cell in response to detecting that at least one neighbor cell supports the reporting criteria, according to an embodiment of the disclosure.

Referring to FIG. 9, at operation S902, the measurement object is configured by the base station. At operation S904, it is detected that the A3 event is configured and that the A3 event is met for any cell. At operation S906, reading of the SIB2 upper layer indication for all the cells for which A3 event is supported begins and is updated in the memory (430).

Figure 10:
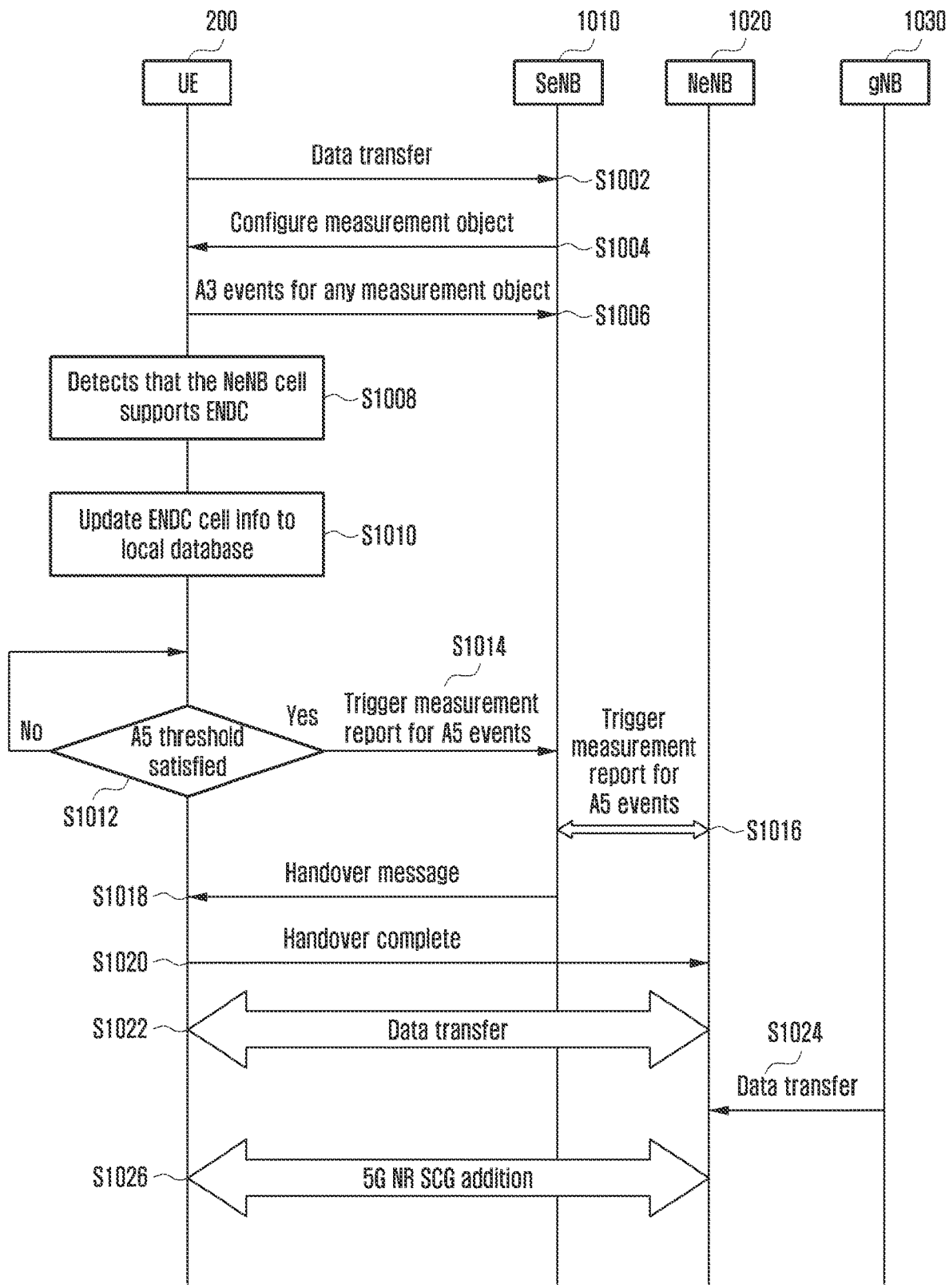
FIG. 10 is a sequential flow diagram illustrating a method for handling handover in the wireless communication system by using an event management with a threshold evaluation, according to an embodiment of the disclosure.

FIG. 10 is a sequential flow diagram illustrating a method for handling handover in the wireless communication system (4000) by using the event management with the threshold evaluation, according to an embodiment of the disclosure.

Referring to FIG. 10, at operation S1002, the UE (200) transfers the data to the SeNB (1010). Based on the data, the SeNB (1010) sends the configured measurement object to the UE (400) at operation S1004. The UE (400) measures the configured measurement object. At operation S1006, the UE (400) shares A3 events for any measurement object and starts reading the SIB2 of the NeNB (1020). At operation S1008, the UE (400) detects that the NeNB cell (1020) supports the ENDC. At operation S1010, the UE (400) updates the ENDC cell info and stores the updated ENDC cell info in the memory (430). At operation S1012, the UE (400) monitors the A3 reported cell for A5 threshold and determines whether A5 threshold is satisfied. If the A5 threshold is not satisfied, then operation S1012 is repeated until the A5 threshold is satisfied. If the A5 threshold is satisfied, then at operation S1014, the UE (400) triggers the measurement report for the A5 events. At operation S1016, the SeNB (1010) and the NeNB (1020) are preparing for the handover. At operation S1018, the SeNB (1010) sends the handover message to the UE (400) and at operation S1020, the UE (400) sends the handover complete message to the NeNB (1020). At operation S1022, the data is transferred between the NeNB (1020) and the UE (400). At operation S1024, the gNB (1030) sends the data transfer to the NeNB (1020). At operation S1026, 5G NR SCG addition is performed.

The various actions, acts, blocks, operations, or the like in the flow charts (S500, S600, S700, S900, S1000, S908 or S1008) may be performed in the order presented, in a different order or simultaneously. Further, in some embodiments, some of the actions, acts, blocks, operations, or the like may be omitted, added, modified, skipped, or the like without departing from the scope of the disclosure.

The embodiments disclosed herein can be implemented using at least one software program running on at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for handling handover in a wireless communication system, the method comprising:
receiving, by a user equipment (UE), a radio resource control (RRC) message including a first measurement configuration and a second measurement configuration for detecting a plurality of neighboring cells from a serving cell;
identifying, by the UE, a first neighboring cell and a second neighboring cell from the plurality of neighboring cells having a signal strength above a predefined threshold based on the RRC message;
identifying, by the UE, that the first neighboring cell supports a next generation core entity to connect to the next generation core entity via the first neighboring cell and the second neighboring cell supports a legacy core entity to connect to the legacy core entity via the second neighboring cell;

determining, by the UE, whether a measurement identity (ID) of the first neighboring cell and a measurement ID of the second neighboring cell are the same;

in response to determining that the measurement ID of the first neighboring cell and the measurement ID of the second neighboring cell are the same:
monitoring a current data throughput of an ongoing service,
determining a first offset and a second offset based on the current data throughput, wherein the second offset is greater than the first offset,
applying the first offset to a measurement quantity threshold for the first neighboring cell,
applying the second offset to a measurement quantity threshold for the second neighboring cell,
transmitting a first measurement report for the first neighboring cell when reaching the measurement quantity threshold with the first offset, and
transmitting a second measurement report for the second neighboring cell when reaching the measurement quantity threshold with the second offset; and in response to determining that the measurement ID of the first neighboring cell and the measurement ID of the second neighboring cell are different:
monitoring a required data rate of a current service,
determining a priority offset value inversely proportional to the required data rate,
applying the priority offset value to a measurement quantity threshold of the first neighboring cell when the required data rate is greater than a predetermined threshold, and
transmitting a measurement report of the first neighboring cell prior to a measurement report of the second neighboring cell based on the applied priority offset value.

2. The method as claimed in claim 1, wherein the transmitting of the first measurement report of the first neighboring cell is prioritized over the second measurement report of the second neighboring cell to the serving cell by one of:
adding an offset to a measurement quantity threshold of the first neighboring cell; and
adding an offset to time to trigger the measurement report of the second neighboring cell.

3. The method as claimed in claim 1, wherein the measurement report for the first neighboring cell and the measurement report of the second neighboring cell is split in order to send the measurement report of the first neighboring cell before the measurement report of the second neighboring cell to the serving cell by one of:
adding an offset to a measurement quantity threshold of the first neighboring cell; and
adding an offset to a timer to trigger the measurement report of the second neighboring cell.

4. The method as claimed in claim 1, further comprising:
acquiring, by the UE, a system information block (SIB) 1 type message from one of the first neighboring cell or the second neighboring cell of the plurality of neighboring cells, wherein the SIB 1 type message comprises a list of public land mobile networks (PLMNs) that is connected to the next generation core entity or the legacy core entity,
wherein the first neighboring cell supports the next generation core entity and the second neighboring cell supports the legacy core entity are identified based on the acquired SIB 1 type message.

5. A method for handling handover in a wireless communication system, the method comprising:
receiving, by a user equipment (UE), a measurement configuration from the wireless communication system, when the UE is connected to a serving cell;
identifying, by the UE, at least one of a first neighboring cell or a second neighboring cell from a plurality of neighboring cells having a signal strength above a signal strength of the serving cell;
determining, by the UE, that the first neighboring cell supports a next generation network and the second neighboring cell does not support the next generation network based on reading a system information block 2 (SIB 2) type message broadcasted by at least one of the first neighboring cell or the second neighboring cell while the UE is in a connected mode;
detecting, by the UE, the signal strength of the serving cell to be below a pre-defined threshold; and
sending, by the UE, a measurement report by prioritizing the first neighboring cell over the second neighboring cell to initiate a handover to the first neighboring cell.

6. The method as claimed in claim 5, further comprising:
starting a timer for the first neighbor cell and delaying to send the measurement report of the first neighbor cell until the timer is expired, when the first neighboring cell does not support the next generation network.

7. The method as claimed in claim 6, further comprising:
determining, by the UE, whether the second neighbor cell supports the next generation network when the first neighbor cell does not support the next generation network; and
performing, by the UE, one of:
in response to determining that the second neighbor cell supports the next generation network, updating information indicating that the second neighbor cell supports the next generation network and sending a measurement report, and
in response to determining that the second neighbor cell does not support the next generation network, starting the timer for a third neighbor cell and delaying the sending the measurement report of the third neighboring cell until the timer expires.

8. A user equipment (UE) for handling handover in a wireless communication system, the UE comprising:
at least one processor; and
memory for storing instructions that, when executed by the at least one processor individually or collectively, cause the UE to:
receive a radio resource control (RRC) message including a first measurement configuration and a second measurement configuration for detecting a plurality of neighboring cells from a serving cell,
identify a first neighboring cell and a second neighboring cell from a plurality of neighboring cells having a signal strength above a predefined threshold based on the RRC message,
identify that the first neighboring cell supports a next generation core entity to connect to the next generation core entity via the first neighboring cell and the second neighboring cell supports a legacy core entity to connect to the legacy core entity via the second neighboring cell,
determine whether a measurement identity (ID) of the first neighboring cell and a measurement ID of the second neighboring cell are the same, in response to determining that the measurement ID of the first neighboring cell and the measurement ID of the second neighboring cell are the same:
: monitor a current data throughput of an ongoing service,
determine a first offset and a second offset based on the current data throughput, wherein the second offset is greater than the first offset,
apply the first offset to a measurement quantity threshold for the first neighboring cell,
apply the second offset to a measurement quantity threshold for the second neighboring cell,
transmit a first measurement report for the first neighboring cell when reaching the measurement quantity threshold with the first offset, and
transmit a second measurement report for the second neighboring cell when reaching the measurement quantity threshold with the second offset, and in response to determining that the measurement ID of the first neighboring cell and the measurement ID of the second neighboring cell are different:
: monitor a required data rate of a current service,
determine a priority offset value inversely proportional to the required data rate,
apply the priority offset value to a measurement quantity threshold of the first neighboring cell when the required data rate is greater than a predetermined threshold, and
transmit a measurement report of the first neighboring cell prior to a measurement report of the second neighboring cell based on the applied priority offset value.

9. The UE as claimed in claim 8, wherein the instructions that, when executed by the at least one processor, cause the UE to prioritize the transmitting of the first measurement report of the first neighboring cell over the second measurement report of the second neighboring cell to the serving cell by one of:
adding an offset to a measurement quantity threshold of the first neighboring cell; and
adding an offset to time to trigger the measurement report of the second neighboring cell.

10. The UE as claimed in claim 8, wherein the instructions that, when executed by the at least one processor, cause the UE to split the measurement report for the first neighboring cell and the measurement report of the second neighboring cell in order to send the measurement report of the first neighboring cell before the measurement report of the second neighboring cell to the serving cell by one of:
adding an offset to a measurement quantity threshold of the first neighboring cell; and
adding an offset to timer to trigger the measurement report of the second neighboring cell.

11. A user equipment (UE) for handling handover in a wireless communication system, the UE comprising:
at least one processor; and
memory for storing instructions that, when executed by the at least one processor individually or collectively, cause the UE to:
receive a measurement configuration from the wireless communication system, when the UE is connected to a serving cell,
identify at least one of a first neighboring cell or a second neighboring cell from a plurality of neighboring cells having a signal strength above a signal strength of the serving cell,
determine that the first neighboring cell supports a next generation network and the second neighboring cell does not support next generation network based on reading a system information block 2 (SIB 2) type message broadcasted by at least one of the first neighboring cell or the second neighboring cell while the UE is in a connected mode,
detect the signal strength of the serving cell to be below a pre-defined threshold, and
send a measurement report by prioritizing the first neighboring cell over the second neighboring cell to initiate a handover to the first neighboring cell.

12. The UE as claimed in claim 11, wherein the instructions that, when executed by the at least one processor, cause the UE to start a timer for the first neighboring cell and delay sending the measurement report of the first neighbor cell until the timer expires, when the first neighboring cell does not support the next generation network.

13. The UE as claimed in claim 12, wherein the instructions that, when executed by the at least one processor, cause the UE to:
determine whether the second neighbor cell supports the next generation network when the first neighbor cell does not support the next generation network; and
perform one of:
in response to determining that the second neighbor cell supports the next generation network, update information indicating that the second neighbor cell supports the next generation network and send a measurement report, and
in response to determining that the second neighbor cell does not support the next generation network, start the timer for a third neighboring cell and delay sending the measurement report of the third neighboring cell until the timer expires.

14. The UE as claimed in claim 13, wherein the instructions that, when executed by the at least one processor, cause the UE to store the updated information in the memory.

15. The UE as claimed in claim 11, wherein the instructions that, when executed by the at least one processor, cause the UE to detect the signal strength of the serving cell to be below the pre-defined threshold based on an A5 event configured by the wireless communication system.

* * * * *